US012731991B2

(12) United States Patent
Hu et al.

(10) Patent No.: US 12,731,991 B2
(45) Date of Patent: Sep. 8, 2026

(54) TERTIARY FREQUENCY MODULATION METHOD FOR POWER SYSTEM

(71) Applicant: HUANENG LANCANG RIVER HYDROPOWER INC., Kunming City (CN)

(72) Inventors: Lin Hu, Kunming City (CN); Shuhong Yin, Kunming City (CN); Yongjun Liu, Kunming City (CN); Wangdan Ni, Kunming City (CN); Dongming Zhong, Kunming City (CN); Yangyicheng Li, Kunming City (CN); Qing Yang, Kunming City (CN); Sen Li, Kunming City (CN)

(73) Assignee: HUANENG LANCANG RIVER HYDROPOWER INC., Kunming City (CN)

( * ) Notice: Subject to any disclaimer, the term of this patent is extended or adjusted under 35 U.S.C. 154(b) by 371 days.

(21) Appl. No.: 18/518,381

(22) Filed: Nov. 22, 2023

(65) Prior Publication Data

US 2024/0313539 A1 Sep. 19, 2024

Related U.S. Application Data

(63) Continuation of application No. PCT/CN2023/128212, filed on Oct. 31, 2023.

(30) Foreign Application Priority Data

Mar. 15, 2023 (CN) ......................... 202310249914.0

(51) Int. Cl.
*H02J 3/0014* (2026.01)
*H02J 3/28* (2026.01)
*H02J 3/38* (2026.01)

(52) U.S. Cl.
CPC ............ *H02J 3/00142* (2026.01); *H02J 3/28* (2013.01); *H02J 3/381* (2013.01)

(58) Field of Classification Search
CPC ........... H02J 3/00142; H02J 3/28; H02J 3/381
See application file for complete search history.

(56) References Cited

U.S. PATENT DOCUMENTS

2020/0169219 A1* 5/2020 Zhang ..................... H02J 3/381

FOREIGN PATENT DOCUMENTS

| | | | | |
|---|---|---|---|---|
| CN | 108306312 A | * | 7/2018 | .............. H02J 3/386 |
| CN | 112366731 A | * | 2/2021 | .............. H02J 3/381 |
| CN | 112583055 A | * | 3/2021 | .............. H02J 3/241 |

* cited by examiner

*Primary Examiner* — Mohammad Ali
*Assistant Examiner* — Dhruvkumar Patel

(57) ABSTRACT

A tertiary frequency modulation method for a power system, AGC based on power plant input performs active power regulation for tertiary frequency modulation in different modes in power plants in case of secondary frequency modulation failure of the power system and unidirectional deviation of grid frequency from rated frequency for a period: perform tertiary frequency modulation based on the reserved capacity of the secondary frequency modulation or the regulation amount of primary frequency modulation or random parameters. The invention relates to tertiary frequency modulation whose action sequence is later than that of the primary frequency modulation and the secondary frequency modulation to realize astatic frequency regulation. Compared with the secondary frequency modulation function, the tertiary frequency modulation function completely gets rid of the dependence on a central node; compared with the primary frequency modulation function, the tertiary frequency modulation method undoubtedly has higher stability and sustainability in the regulation effect.

14 Claims, 15 Drawing Sheets

140MW/-0.014Hz
120MW/-0.012Hz
100MW/-0.01Hz
80MW/-0.008Hz
60MW/-0.006Hz
40MW/-0.004Hz
20MW/-0.002Hz
0
0
5
10
15
20
25
30
Time/s
System frequency
Total target regulation amount of primary frequency modulation for 3 power plants
Total regulation amount of primary frequency modulation for 3 power plants

TERTIARY FREQUENCY MODULATION METHOD FOR POWER SYSTEM

TECHNICAL FIELD

The invention relates to the technical field of power system automation control, in particular to a tertiary frequency modulation method for a power system.

BACKGROUND ART

The grid frequency reflects the balance between the generated power and consumed power of the power system: when the generated power is higher than the consumed power, the grid frequency is higher than the rated frequency (50 Hz); when the generated power is lower than the consumed power, the grid frequency is lower than the rated frequency. Taking the grid frequency as the reference index, the power system makes the generated power and the consumed power return to the balanced state by regulating the two, and the main regulation modes are primary frequency modulation and secondary frequency modulation for the generated power.

Primary frequency modulation means that when the deviation between the grid frequency and the rated frequency exceeds the primary frequency modulation threshold value (such as 0.05 Hz for hydropower and 0.03 Hz for thermal power in most of the power grids), the governor system of each unit regulates the active power of the unit according to the preset "frequency-power" regulation coefficient to make up for the imbalance between the generated power and the consumed power of the power grid to a certain extent. As no unified control center performs the coordinated control of each unit participating in primary frequency modulation, which is related to the regulation calculation mechanism and cannot fully restore the grid frequency to the rated frequency, primary frequency modulation is also called deviating regulation. However, the primary frequency modulation has the following advantages: 1) As there is no unified control center, the risk of complete failure like secondary frequency modulation (for example, the secondary frequency modulation dispatching function module abnormally exits) is also avoided, thus obtaining a very high overall reliability; 2) The regulation instructions are calculated directly by the unit, and the dispatching calculation, command transmission and power plant AGC allocation of the secondary frequency modulation are omitted, so that the response speed to the abnormal grid frequency is much faster than that of the secondary frequency modulation.

Secondary frequency modulation means that when the deviation between the grid frequency and the rated frequency exceeds the secondary frequency modulation threshold value, the dispatching mechanism regulates the output active power of each grid-connected power plants within the control range, so that the generated power and the consumed power of the grid can restore the balanced state to ensure that the difference between the grid frequency and the rated frequency is within the allowable range. Secondary frequency modulation includes the following steps: 1) The dispatching mechanism calculates the generated power change required to restore the grid frequency to the rated frequency according to the grid frequency deviation and the grid "frequency-power" sensitivity coefficient; 2) The dispatching mechanism corrects the active power set value of each grid-connected power plant according to the calculation results and sends power regulation instructions; 3) After each power plant receives the new active power set value, AGC distributes the total active power set value of the power plant to each unit controlled by AGC; 4) The active power control system of each unit performs the active power closed-loop feedback regulation according to the new active power set value of the single unit.

It is easy to see from the above that the current frequency regulation mechanism of the power system is that the deviation of the grid frequency relative to the rated frequency is weakened by relying on the speed and stability of primary frequency modulation when the generated power and the consumed power are unbalanced and the grid frequency is deviated from the rated frequency; then the generated power and the consumed power of the power system are restored to the balanced state through the non-deviating regulation amount of secondary frequency modulation. However, this frequency regulation mechanism has the problem that the secondary frequency modulation function depends on the calculation center and regulation center arranged in the grid dispatching automation control system. If the central node is abnormal, the secondary frequency modulation function will be in a complete failure state, and the grid frequency can only be corrected by the spontaneous regulation amount of primary frequency modulation of each generator unit to a limited degree. At present, for the thermal generating units occupying the main proportion, the primary frequency modulation takes the unit heat or energy storage as a regulation resource. Although the thermal generating units have better primary frequency modulation performance than the hydropower generating units, the thermal generating units cannot last too long. Once the regulation resource is exhausted, the grid frequency will return to the uncontrolled unbalanced state. Considering the increasingly severe network security situation at present, the frequency regulation mechanism undoubtedly becomes an important hidden danger threatening the security of the power system as it relies too much on the secondary frequency modulation center.

It should be pointed out that in addition to primary frequency modulation and secondary frequency modulation, the concept of "tertiary frequency modulation" is proposed in the literatures, for example, "Chang Yekui, Liu Rao, Wang Chong, Zhang Xin, Li Weidong. Control Strategy Research on Participation of Nuclear Power in Tertiary Frequency Modulation [J]. Power System Protection and Control, 2014, 42(08):71-76", and "Liu Weilie. Frequency Modulation and Automatic Generation Control of Power System [M]. Beijing: China Electric Power Press, 2006:28-40", but the concept of tertiary frequency modulation proposed in the above literatures refers to the load pre-distribution and pre-arrangement of each power plant based on load prediction, its function is to make the change trend of generated power and consumed power of the power system basically match by accurate prediction and correct planning; compared with the post-regulation mechanism making primary frequency modulation and secondary frequency modulation restored to the balanced state through power regulation after being unbalanced, the tertiary frequency modulation defined in the literatures undoubtedly belongs to a completely different functional category, and it is not proper to call it "frequency modulation" in the field of regulation or frequency modulation. Considering that its action time precedes primary frequency modulation and secondary frequency modulation, there is no reason to name it "tertiary" before "frequency modulation". In fact, this concept has never been promoted in the field of power system engineering practice.

Therefore, how to set the function of "tertiary frequency modulation" with action sequence later than that of "primary frequency modulation" and "secondary frequency modulation" in addition to primary frequency modulation and secondary frequency modulation is a problem to be solved. At the same time, considering that the functions of primary frequency modulation and secondary frequency modulation have been used for many years and the regulation conflict problem in some working conditions has not been properly solved, how to design the regulation mechanism of tertiary frequency modulation without interfering with the functions of primary frequency modulation and secondary frequency modulation is still a relatively difficult problem.

CONTENT OF INVENTION

The invention aims to provide a tertiary frequency modulation method for a power system, whose action sequence is later than the primary frequency modulation and the secondary frequency modulation. When the secondary frequency modulation function of the power system cannot play a role, the decentralized distributed regulation can be performed for the active power of each power plant, so that the frequency of the power system can be restored to the basically balanced state. The invention is realized by adopting the following technical proposal:

A tertiary frequency modulation method for a power system is characterized in that AGC based on power plant input performs active power regulation for tertiary frequency modulation in following modes in power plants in case of secondary frequency modulation failure of the power system and unidirectional deviation of grid frequency from rated frequency for a period:

Tertiary frequency modulation mode based on the reserved capacity of secondary frequency modulation: if the adjustable capacity is reserved for the secondary frequency modulation in the power plant, and the absolute deviation between an active power set value and an active power planned value of the power plant is smaller than the reserved capacity of secondary frequency modulation, correct the active power set value in a cyclic iterative manner based on the reserved capacity of secondary frequency modulation and the tertiary frequency modulation coefficient;

Or tertiary frequency modulation mode based on the regulation amount of primary frequency modulation: obtain the regulation amount of primary frequency modulation according to the actual regulation amount of primary frequency modulation, the target regulation amount of primary frequency modulation or the corrected regulation amount of primary frequency modulation, assign the regulation amount of primary frequency modulation to an element in an array, and correct the plant active power set value according to a weighted average after several cycles;

Or tertiary frequency modulation mode based on random parameters: equally segment the actual output value of plant active power, generate random numbers by a real-time monitoring system according to the number of segmented units, and assign the random numbers to each element in the array in turn; obtain a corrected power according to the grid frequency deviation, the capacity of segmented units, the number of specified values in the array and the preset power regulation factor of tertiary frequency modulation in each cycle, and correct the plant active power set value according to the corrected power;

After the corrected active power set values of the plant are obtained in each mode, AGC modifies the active power set value of each unit and performs closed-loop active power regulation for each unit;

When the grid frequency deviation falls back or AGC state changes reach the stop trigger condition, stop tertiary frequency modulation.

Compared with the prior art, the invention has the following beneficial technical effects:

1. The tertiary frequency modulation method for the power system in the invention is "tertiary frequency modulation" which realizes the non-deviating frequency regulation and has the action sequence later than the primary frequency modulation and the secondary frequency modulation; the tertiary frequency modulation regulation amount of the invention is realized by modifying the AGC active power set value of the power plant, which belongs to the conventional active power regulation mechanism, and basically all functions are deployed in the real-time monitoring system of the power plant side (distributed in each power plant) and do not depend on any central node; the tertiary frequency modulation method for the power system in the invention generally adopts the idea of periodic iterative regulation, and the regulation mechanism is to gradually restore the system frequency to a more balanced state through multiple regulations under a long time scale. Therefore, compared with the existing primary frequency modulation function, the tertiary modulation method of the invention has the characteristic of non-deviating regulation.
2. The tertiary frequency modulation method for the power system in the invention calculates the regulation amount according to the grid frequency, and the regulation mechanism and result are similar to that of the existing primary frequency modulation function, thus avoiding the conflict between the tertiary frequency modulation function of the invention and the primary frequency modulation function. The up-regulation coefficient and down-regulation coefficient of the high priority regulation mode of the invention need to be calculated by the dispatching automation system and sent to the real-time monitoring system of the power plant, but the lead time for calculation and sending is great, so adverse effects will not be caused on the tertiary frequency modulation function of each power plant unless the dispatching automation system has a serious failure for a very long time; considering that the low priority regulation mode always available is also designed in the method of the invention, it can be considered that compared with the secondary frequency modulation function, the tertiary frequency modulation function of the invention completely gets rid of the dependence on a central node, thus greatly improving the reliability of the function. Compared with the primary frequency modulation function realized by utilizing the heat or energy storage resources of the thermal power unit, the tertiary frequency modulation method of the invention undoubtedly has higher stability and sustainability in the regulation effect.
3. In the tertiary frequency modulation method for the power system in the invention, strict starting conditions are set, the tertiary frequency modulation function of the power plant can be enabled only when the grid frequency unidirectionally deviates from the rated frequency for a long time and the secondary frequency modulation function of the dispatching mechanism does not play a role for a long time, thus avoiding the conflict between the tertiary frequency modulation function of the invention and the existing secondary frequency modulation function on the one hand, and avoiding the possibility that the tertiary frequency modulation function of the invention participates in the regulation under the condition of grid frequency oscillation and promotes the frequency oscillation on the other hand.

4. In the tertiary frequency modulation method for the power system in the invention, various prevention mechanisms are adopted to avoid the grid frequency oscillation that may be caused by distributed regulation, including setting a long iterative regulation cycle, incorporating the grid frequency deviation under a longer time scale into the corrected power calculation, and preventing each power plant from generating resonant regulation by segmenting regulation units and introducing random numbers in the tertiary frequency modulation low priority regulation mode based on random probability, thus effectively preventing the tertiary frequency modulation function of the invention from causing negative effects on the power system.

5. In the tertiary frequency modulation method for the power system in the invention, the high priority regulation mode with start priority is set; in fact, the priority of tertiary frequency modulation regulation is given to the secondary frequency modulation power plant prearranged by the dispatching mechanism; as the dispatching mechanism has fully considered the load flow constraint and other safety conditions when prearranging the secondary frequency modulation power plant, and the arranged secondary frequency modulation power plant also reserves sufficient regulation space or capacity, so on the one hand, the regulation result of the tertiary frequency modulation function of the invention is more in line with the safety requirements and dispatching expectations of the power system, and on the other hand, the effective action of the tertiary frequency modulation function is guaranteed.

EMBODIMENTS

Figure 1:
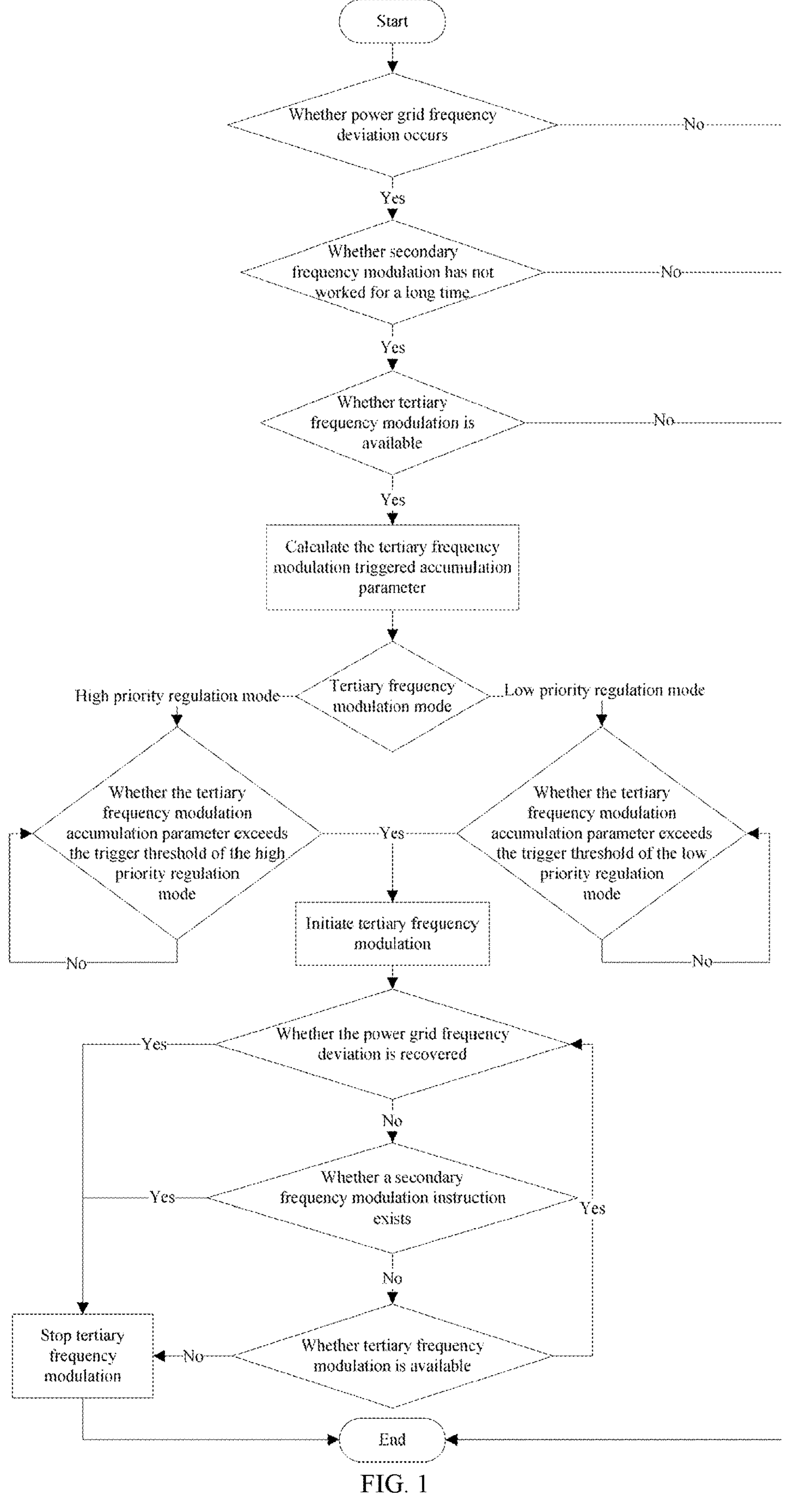
FIG. 1 is the flow diagram of tertiary frequency modulation method for the power system in the invention.

The invention is further described in detail in conjunction with the drawings.

The conventional AGC system has the functions of modifying the plant active power set value according to the secondary frequency modulation instruction or the operation command of the operator and distributing the modified value to each unit; in the invention, the tertiary frequency modulation function is added in the AGC system, and the start and stop of the AGC tertiary frequency modulation and the regulation of modes are described in detail below.

In a tertiary frequency modulation method for a power system, AGC based on power plant input performs active power regulation for tertiary frequency modulation in following modes in power plants in case of secondary frequency modulation failure of the power system and unidirectional deviation of grid frequency from rated frequency for a period:

Tertiary frequency modulation mode based on the reserved capacity of secondary frequency modulation: if the adjustable capacity is reserved for the secondary frequency modulation in the power plant, and the absolute deviation between an active power set value and an active power planned value of the power plant is smaller than the reserved capacity of secondary frequency modulation, correct the active power set value in a cyclic iterative manner based on the reserved capacity of secondary frequency modulation and the tertiary frequency modulation coefficient;

Or tertiary frequency modulation mode based on the regulation amount of primary frequency modulation: obtain the regulation amount of primary frequency modulation according to the actual regulation amount of primary frequency modulation, the target regulation amount of primary frequency modulation or the corrected regulation amount of primary frequency modulation, assign the regulation amount of primary frequency modulation to an element in an array, and correct the plant active power set value according to a weighted average after several cycles;

Or tertiary frequency modulation mode based on random parameters: equally segment the actual output value of plant active power, generate random numbers by a real-time monitoring system according to the number of segmented units, and assign the random numbers to each element in the array in turn; obtain a corrected power according to the grid frequency deviation, the capacity of segmented units, the number of specified values in the array and the preset power regulation factor of tertiary frequency modulation in each cycle, and correct the plant active power set value according to the corrected power;

After the corrected active power set values of the plant are obtained in each mode, AGC modifies the active power set value of each unit and performs closed-loop active power regulation for each unit;

When the grid frequency deviation falls back or AGC state changes reach the stop trigger condition, stop tertiary frequency modulation.

Further, the tertiary frequency modulation mode based on the reserved capacity of secondary frequency modulation is to set an array containing n elements in the real-time monitoring system of the power plant, assign a value to the first element in the array in each cycle according to the reserved capacity of the secondary frequency modulation and the tertiary frequency modulation coefficient, and assign values to all elements in the array in turn; after n cycles, all the elements in the array are assigned or iterated, then the corrected power is obtained according to the weighted average of the array, and the plant active power set value is corrected.

Further, the tertiary frequency modulation mode based on the regulation amount of primary frequency modulation is to set an array containing n elements in the real-time monitoring system of the power plant, assign a value to the first element in the array in each cycle according to the actual regulation amount of primary frequency modulation, the target regulation amount of primary frequency modulation or the corrected regulation amount of primary frequency modulation and assign values to all elements in the array in turn; after n cycles, all the elements in the array are assigned or iterated, then the corrected power is obtained according to the weighted average of the array, and the plant active power set value is periodically corrected.

Further, the tertiary frequency modulation mode based on random parameters is to equally segment the actual output value of plant active power, generate random numbers by the real-time monitoring system according to the number of segmented units, and assign the random numbers to each element in the array in turn; take several cycles as an iterative regulation cycle, obtain a random corrected power according to the grid frequency deviation, the capacity of segmented units, the number of specified values in the array and the preset power regulation factor of tertiary frequency modulation in each cycle, and correct the plant active power set value according to the random corrected power; in each iterative regulation cycle, the value of each element in the array is subtracted by 1 when the correction for each cycle is carried out, and then the correction for the next cycle is carried out; after the number of cycles in one iterative regulation cycle is executed, the random numbers are generated again to execute the next iterative regulation cycle.

The following is an embodiment of tertiary frequency modulation based on the power plant AGC.

As shown in FIG. 1, a tertiary frequency modulation method for a power system includes the following steps:

S1000) Add a tertiary frequency modulation function block in the AGC system, and set the tertiary frequency modulation high priority regulation mode and the tertiary frequency modulation low priority regulation mode;

S1100) Take the tertiary frequency modulation mode based on the reserved capacity of secondary frequency modulation as the high priority regulation mode, which is available if the following conditions are met at the same time:

S1110) The power plant reserves the adjustable capacity for secondary frequency modulation because of bidding in the frequency modulation market;

Assuming that the rated capacity of a single unit for the power plant is 300 MW and the plant active power planned value sent by the dispatching mechanism at a certain time is 290 MW, if the dispatching mechanism does not require the power plant to reserve the capacity for secondary frequency modulation, only one unit of the power plant is started to meet the requirements of the plant active power set value; meanwhile, because the power plant has not reserved the adjustable capacity for secondary frequency modulation, the tertiary frequency modulation high priority regulation mode of the power plant is not available; however, if the dispatching mechanism requires the power plant to reserve the adjustable capacity for secondary frequency modulation (assuming that the reserved capacity is 20 MW), at least two units of the power plant need to be started to simultaneously meet the requirements of the plant active power planned value and the reserved capacity for secondary frequency modulation; at the same time, because the power plant has reserved the adjustable capacity for secondary frequency modulation, one of the necessary conditions for the tertiary frequency modulation high priority regulation mode of the power plant, namely, condition described in S1110, is met.

S1120) The dispatching mechanism sends the tertiary frequency modulation coefficient in this period;

At present, most dispatching mechanisms have the function of sending the plant active power planned value in advance to the grid-connected power plants, specifically, sending the plant active power planned value for 24 hours of the next day to the power plants at a data point of 15 minutes in advance every day; the dispatching mechanism can calculate the tertiary frequency modulation coefficient of each power plant according to the plant active power planned value and the reserved capacity of secondary frequency modulation, so the tertiary frequency modulation coefficient can be obtained in advance according to the estimated results and data frequency of the plant active power planned value and the reserved capacity of secondary frequency modulation, and sent to the power plant.

S1130) The absolute deviation between the plant active power set value and the plant active power planned value is less than the reserved capacity of secondary frequency modulation.

For example, S1110 assumes that the rated capacity of a single unit for the power plant is 300 MW, the plant active power planned value sent by the dispatching mechanism at a certain time is 290 MW, and the dispatching mechanism requires the power plant to reserve the adjustable capacity for secondary frequency modulation (assuming that the reserved capacity is 20 MW). To meet the requirements of the plant active power planned value and the reserved capacity for secondary frequency modulation regulation, two units of the power plant are started at that time, and the reserved space for secondary frequency modulation is [290−20=270 MW, 290+20=310 MW]; if the plant active power set value is less than 270 MW or greater than 310 MW, it is considered that the secondary frequency modulation resource of the power plant is consumed and the tertiary frequency modulation high priority regulation mode is unavailable.

S1200) The low priority regulation mode includes two regulation modes: tertiary frequency modulation mode based on regulation amount of primary frequency modulation and tertiary frequency modulation mode based on random parameters, which are alternative;

S1210) In the tertiary frequency modulation low priority regulation mode based on regulation amount of primary frequency modulation, regulate according to the actual regulation amount or target regulation amount or corrected regulation amount of primary frequency modulation in case of frequency deviation;

S1220) In the tertiary frequency modulation low priority regulation mode based on random probability, regulate according to the system frequency deviation, the preset frequency modulation coefficient and the random number generated by the real-time monitoring system.

Compared between two alternative low priority regulation modes, the tertiary frequency modulation low priority regulation mode based on regulation amount of primary frequency modulation described in S1210 has the advantage of simple logic design; the tertiary frequency modulation low priority regulation mode based on random probability described in S1220 has the advantage of effectively preventing ultra-low frequency oscillation caused by the tertiary frequency modulation of multiple power plants with similar regulation performance.

Figure 2:
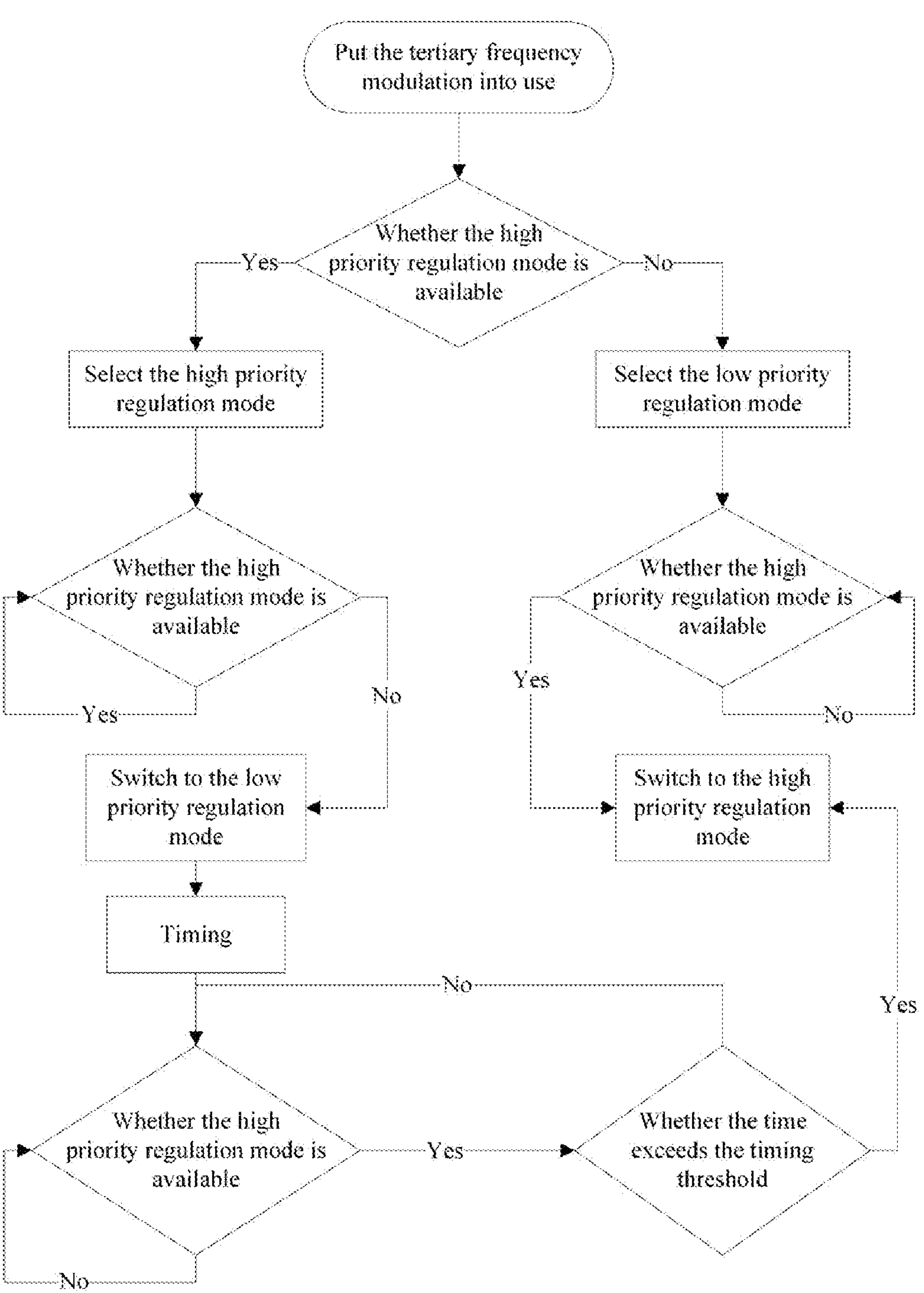
FIG. 2 is the switching logic diagram of the high priority regulation mode and priority regulation mode of tertiary frequency modulation in the invention.

As shown in FIG. 2, S1300) gives the switching mode between the tertiary frequency modulation high priority regulation mode and the tertiary frequency modulation low priority regulation mode:

S1310) During the use of tertiary frequency modulation, select the high priority regulation mode for the tertiary frequency modulation if available;

S1320) During the use of tertiary frequency modulation, select the low priority regulation mode for the tertiary frequency modulation if the high priority regulation mode for the tertiary frequency modulation is not available;

S1330) After the use of tertiary frequency modulation, switch the tertiary frequency modulation to the low priority regulation mode if the tertiary frequency modulation is in the high priority regulation mode and the high priority regulation mode for the tertiary frequency modulation is not available;

S1340) After the use of tertiary frequency modulation, judge the availability of the high priority regulation mode for the tertiary frequency modulation if the tertiary frequency modulation is in the low priority regulation mode and the time since the last tertiary frequency modulation mode switching is greater than the timing threshold T:

S1341) Switch the tertiary frequency modulation to the high priority regulation mode if the high priority regulation mode for the tertiary frequency modulation is available;

S1342) Keep the tertiary frequency modulation in the high priority regulation mode if the high priority regulation mode for the tertiary frequency modulation is not available. The logic described in S1340 is to prevent the frequent switching between the tertiary frequency modulation high priority regulation mode and the tertiary frequency modulation low priority regulation mode that may occur and the regulation exceptions that may be caused therefrom.

S2000) Trigger of tertiary frequency modulation start:

S2100) Set the parameters used to determine whether the tertiary frequency modulation is self-started, including:

S2110) Set the trigger thresholds for the tertiary frequency modulation low priority regulation mode and the tertiary frequency modulation low priority regulation mode, where the latter (the trigger threshold for the low priority regulation mode) is higher than the former (the trigger threshold for the high priority regulation mode);

S2120) Set the starting threshold value $\Delta f_1$ for tertiary frequency modulation, and $\Delta f_1 \geq \Delta f_3$, where $\Delta f_3$ is the threshold of primary frequency modulation; an alternative method is to set the tertiary frequency modulation starting threshold directly according to the primary frequency modulation threshold, that is, set the tertiary frequency modulation starting threshold $\Delta f_1$ for the thermal power station to 0.03 Hz, set the tertiary frequency modulation starting threshold $\Delta f_1$ for the hydropower station to 0.05 Hz.

S2130) Set the trigger accumulation parameter s for tertiary frequency modulation;

S2140) Set the stop threshold value $\Delta f_5$ for tertiary frequency modulation, and $\Delta f_5 < \Delta f_1$; if the tertiary frequency modulation starting threshold $\Delta f_1$ is set as described in S2120, an alternative method is to set the tertiary frequency modulation starting threshold $\Delta f_5$ for the thermal power station to 0.02 Hz and the tertiary frequency modulation starting threshold $\Delta f_5$ for the hydropower station to 0.03 Hz.

S2200) Judge the resetting conditions of the trigger accumulation parameter for the tertiary frequency modulation in each cycle:

S2210) Compare the absolute value of the system frequency deviation with the tertiary frequency modulation starting threshold value $\Delta f_1$; if $|f-50| < \Delta f_1$, reset the trigger accumulation parameter s for the tertiary frequency modulation, where f is the grid frequency; the absolute value of the system frequency deviation and the system frequency deviation in the invention are the absolute value of the grid frequency deviation and the grid frequency deviation;

The logic design in S2210 is to prevent the tertiary frequency modulation from participating in regulation under the condition of system frequency oscillation, and the tertiary frequency modulation is originally designed to correct the long-term continuous and unidirectional system deviation; in fact, for the tertiary frequency modulation lacking the control center and aiming at non-deviating regulation, the possibility of resonance formed by superposition of the regulation effect and frequency oscillation is higher than that of primary frequency modulation and secondary frequency modulation if the tertiary frequency modulation participates in regulation in the case of system frequency oscillation.

S2220) Judge whether AGC is put into use in the power plant; if not, reset the trigger accumulation parameter s for the tertiary frequency modulation;

S2230) Judge whether AGC is put into use in the unit; if not, reset the trigger accumulation parameter s for the tertiary frequency modulation;

Tertiary frequency modulation is active power regulation based on the AGC function of the power plant. Therefore, as described in S2220 and S2230, the necessary condition for the tertiary frequency modulation starting is that the AGC function of the power plant can play a normal role.

S2240) Judge whether a new AGC regulation instruction is received; if yes, reset the trigger accumulation parameter s for the tertiary frequency modulation;

The tertiary frequency modulation regulation of the invention is spontaneous regulation deployed in the automatic control system of the power plant, and is originally designed to automatically correct the frequency deviation of the grid system when the secondary frequency modulation of the dispatching mechanism or the manual regulation of the power plant does not work for a long time. Since both the tertiary frequency modulation and the secondary frequency modulation of the dispatching mechanism or the manual regulation of the power plant focus on the plant active power set value, it is possible to cause conflict, offset or other unpredictable abnormal conditions in case of simultaneous regulation, so only one of the three regulation modes takes effect at the same time, that is, the AGC regulation source is set to receive secondary frequency modulation instructions only on the dispatching side or receive the instructions of the operator only on the power plant side; the mechanism described in S2240 determines that the tertiary frequency modulation can be regulated only when the above two regulation modes have no action for a long time.

S2250) Judge whether the tertiary frequency modulation function is in use or exit state; if in exit state, reset the trigger accumulation parameter s for the tertiary frequency modulation;

S2270) If the conditions of S2210 to S2250 are not met, the trigger accumulation parameter s for the tertiary frequency modulation will not be reset.

S2300) When resetting is not performed, accumulate the trigger accumulation parameters for the tertiary frequency modulation in each cycle:

S2310) Compare the absolute value of the system frequency deviation collected in the current cycle with that collected in the previous cycle:

S2311) If the absolute value of the system frequency deviation in the current cycle is less than that in the previous cycle, that is, $|f-50|<|f'-50|$, skip the subsequent steps following S2300 and keep the trigger accumulation parameter s for the tertiary frequency modulation unchanged, wherein, f' is the grid frequency collected in the previous cycle;

S2312) If the absolute value of the system frequency deviation in the current cycle is greater than that in the previous cycle, that is, $|f-50|\geq|f'-50|$, execute S2320 and accumulate the trigger accumulation parameter s for the tertiary frequency modulation. The logic described in S2310 aims to prevent the effect of tertiary frequency modulation when the system frequency is restored from the deviated state to the balanced state. If the abnormal factors causing the system frequency deviation are eliminated, or in case the dispatching mechanism performs secondary frequency modulation through other power plants, the action of tertiary frequency modulation is likely to lead to repeated regulation or overregulation, resulting in the system frequency oscillation. Therefore, the action of tertiary frequency modulation should be prevented according to the change trend of the system frequency deviation.

S2320) Accumulate and iterate the trigger accumulation parameter s for the tertiary frequency modulation according to the system frequency deviation and integration time:

S2321) The theoretical calculation formula for accumulating the trigger accumulation parameter s for the tertiary frequency modulation is $s=s+\int(f-50-\Delta f_2)dt$, where $\Delta f_2$ is the artificially set constant, satisfying $0<\Delta f_2<\Delta f_1$, and dt is the time integral;

S2322) The actual calculation formula for accumulating the trigger accumulation parameter s for the tertiary frequency modulation is $s=s+(|f-50|-\Delta f2)\times TS$, where TS is the cycle time if the system has a constant calculation cycle, or TS is the average cycle time or estimated cycle time if the system has no constant calculation cycle. The manually set constant $\Delta f_2$ is introduced into the calculation formula of S2320, and $0<\Delta f_2<\Delta f_1$ is required to obtain a preferred cumulative weight. Although setting $\Delta f_2$ to 0 or $\Delta f_1$ can guarantee a large frequency deviation and a high cumulative weight, the acceleration of the cumulative weight change may be low when $\Delta f_2$ is set to 0, and the acceleration of the cumulative weight change may be high when $\Delta f_1$ is set, which will cause difficulties in setting the tertiary frequency modulation trigger threshold.

Figure 3:
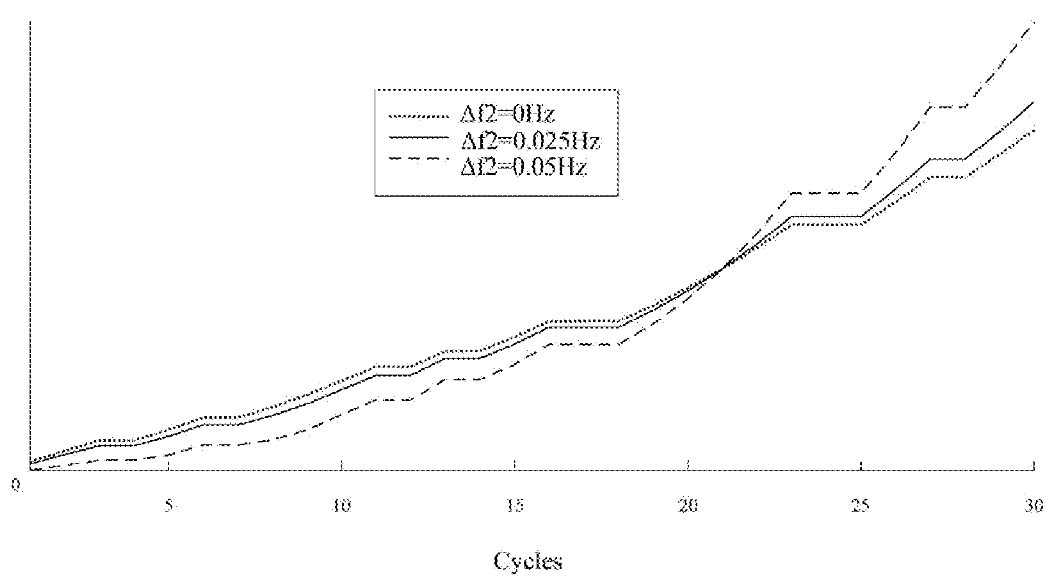
FIG. 3 is the comparison of the change trend of the starting trigger accumulation parameter for tertiary frequency modulation in the invention under different $\Delta f_2$ set values.

Assuming that the system cycle time is 2 seconds and $\Delta f_1$ is 0.05 Hz, the changes of trigger accumulation parameters are shown in Table 1 assuming that $\Delta f_2$ is 0, 0.025 Hz and 0.05 Hz respectively, and the comparison of their change trends after modifying the coordinate system is shown in FIG. 3.

TABLE 1

Changes of Trigger Accumulation Parameters

| Cycle | Frequency | Trigger accumulation parameter | | | Cycle | Frequency | Trigger accumulation parameter | | |
|---|---|---|---|---|---|---|---|---|---|
| | | $\Delta f_2 =$ 0 | $\Delta f_2 =$ 0.025 | $\Delta f_2 =$ 0.05 | | | $\Delta f_2 =$ 0 | $\Delta f_2 =$ 0.025 | $\Delta f_2 =$ 0.05 |
| 1 | 50.05 | 0.1 | 0.05 | 0 | 16 | 50.09 | 1.7 | 1.1 | 0.5 |
| 2 | 50.06 | 0.22 | 0.12 | 0.02 | 17 | 50.08 | 1.7 | 1.1 | 0.5 |
| 3 | 50.06 | 0.34 | 0.19 | 0.04 | 18 | 50.07 | 1.7 | 1.1 | 0.5 |
| 4 | 50.05 | 0.34 | 0.19 | 0.04 | 19 | 50.09 | 1.88 | 1.23 | 0.58 |
| 5 | 50.06 | 0.46 | 0.26 | 0.06 | 20 | 50.10 | 2.08 | 1.38 | 0.68 |
| 6 | 50.07 | 0.6 | 0.35 | 0.1 | 21 | 50.11 | 2.3 | 1.55 | 0.8 |
| 7 | 50.06 | 0.6 | 0.35 | 0.1 | 22 | 50.12 | 2.54 | 1.74 | 0.94 |
| 8 | 50.06 | 0.72 | 0.42 | 0.12 | 23 | 50.13 | 2.8 | 1.95 | 1.1 |
| 9 | 50.07 | 0.86 | 0.51 | 0.16 | 24 | 50.12 | 2.8 | 1.95 | 1.1 |
| 10 | 50.08 | 1.02 | 0.62 | 0.22 | 25 | 50.11 | 2.8 | 1.95 | 1.1 |
| 11 | 50.08 | 1.18 | 0.73 | 0.28 | 26 | 50.13 | 3.06 | 2.16 | 1.26 |
| 12 | 5 | 1 | 0.73 | 0.28 | 27 | 50.1 | 3.34 | 2.39 | 1.44 |
| | 0.06 | .18 | | | | 4 | | | |
| 13 | 50.09 | 1.36 | 0.86 | 0.36 | 28 | 50.12 | 3.34 | 2.39 | 1.44 |
| 14 | 50.08 | 1.36 | 0.86 | 0.36 | 29 | 50.13 | 3.6 | 2.6 | 1.6 |
| 15 | 50.08 | 1.52 | 0.97 | 0.42 | 30 | 50.14 | 3.88 | 2.83 | 1.78 |
| | 0.06 | .18 | | | | 4 | | | |

S2400) Compare the trigger accumulation parameter for tertiary frequency modulation with the trigger threshold frequency modulation in each cycle:

S2410) If the trigger accumulation parameter s for tertiary frequency modulation is less than the trigger threshold in the tertiary frequency modulation high priority regulation mode, the tertiary frequency modulation will not be started;

S2420) If the trigger accumulation parameter s for tertiary frequency modulation is greater than in the tertiary frequency modulation high priority regulation mode, but less than the trigger threshold in the tertiary frequency modulation low priority regulation mode, judge the regulation mode used for the tertiary frequency modulation:

S2421) If the tertiary frequency modulation is in high priority regulation mode, the tertiary frequency modulation will be started;

S2422) If the tertiary frequency modulation is in low priority regulation mode, the tertiary frequency modulation will not be started.

S2430) If the trigger accumulation parameter s for tertiary frequency modulation is greater than the trigger threshold in the tertiary frequency modulation low priority regulation mode, the tertiary frequency modulation will be started.

The significance of the mechanism described in S2400 lies in that when it is necessary to start the tertiary frequency modulation, the regulation resources of the prearranged secondary frequency modulation power plant are preferentially utilized to better meet the safety conditions such as load flow constraints of the power system.

Figure 4:
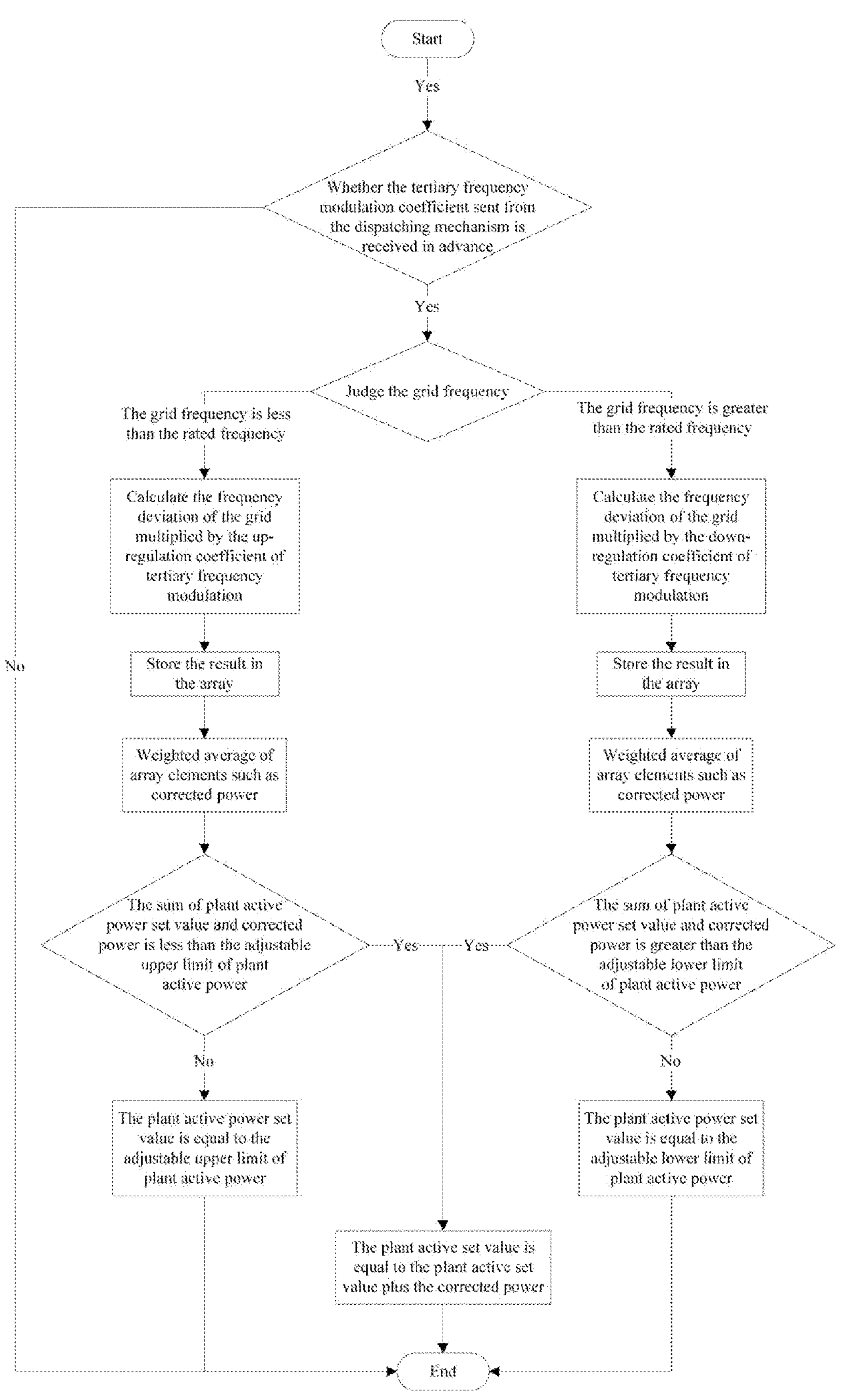
FIG. 4 is the sequential control logic diagram of the tertiary frequency modulation high priority regulation mode in the invention.

As shown in FIG. 4, the regulation mechanism and strategy for tertiary frequency modulation based on the reserved capacity of secondary frequency modulation in S3000) include:

S3100) The power grid calculates the tertiary frequency modulation coefficient in advance and sends it to the power plant in advance at a fixed period, including the following steps:

S3110) Adopt the ratio of the whole grid load to KF in the secondary frequency modulation, where KF is the ratio of the regulation amount of secondary frequency modulation to the frequency deviation;

S3120) Based on the predicted future whole grid load and the ratio of the whole grid load to KF in the second frequency modulation, divide the predicted future whole grid load in each period by the ratio of the whole grid load to KF in the second frequency modulation to obtain KF in each period in the future;

S3130) Under the operation mechanism of the power system frequency modulation market, power plants for secondary frequency modulation need to reserve an appropriate regulation capacity of secondary frequency modulation in each period as planned; assume that the ratio of the regulation amount of secondary frequency modulation to the frequency deviation obtained by S3120 is $K_F$ in a certain period in the future, and a total of a power plants participate in secondary frequency modulation, the up-regulated capacity of secondary frequency modulation for a power plant is $\overline{P}$, and the down-regulated capacity of secondary frequency modulation is P, then:

S3131) The tertiary frequency modulation up-regulation coefficient of the power plant is $\overline{k_f}$, $$\overline{k_f} = K_F \times \frac{\overline{P}}{\sum_{i=1}^{a} \overline{P_i}},$$

where $\overline{P_i}$ is the reserved up-regulated capacity of second frequency modulation for the $i^{th}$ power plant;

S3132) The tertiary frequency modulation down-regulation coefficient of the power plant is $\underline{k_f}$, $$\underline{k_f} = K_F \times \frac{\underline{P}}{\sum_{i=1}^{a} \underline{P_i}},$$

where $\underline{P_i}$ is the reserved down-regulated capacity of second frequency modulation for the $i^{th}$ power plant.

Assuming that the ratio $K_F$ of the regulation amount of secondary frequency modulation to the frequency deviation obtained by the dispatching mechanism during the 15-minute period from 16:00 to 16:15 is 2000 MW/Hz, the capacity of secondary frequency modulation is reserved for three power plants, the up-regulated capacities are 100 MW, 200 MW and 200 MW respectively, and the down-regulated capacities are 150 MW, 250 MW and 100 MW respectively, then the up-regulation coefficients of the three power plants are 400 MW/Hz, 800 MW/Hz and 800 MW/Hz respectively, and the down-regulation coefficients are 600 MW/Hz, 1000 MW/Hz and 400 MW/Hz respectively.

S3200) Set an array $$[\Delta p_1^1, \Delta p_1^2 \ldots \Delta p_1^n]$$

containing n elements in the real-time monitoring system of the power plant, where n is a manually set parameter, n×TS is 2 to 3 times the time required for the power plant unit to complete an active power regulation, and the initial value of variables contained by the array is 0; TS is the AGC system cycle;

S3300) Assign a value to $$\Delta p_1^1$$

in each AGC system cycle, and assign values to all elements of the array in turn, so that $$\Delta p_1^n = \Delta p_1^{n-1} \text{ and } \Delta p_1^{n-1} = \Delta p_1^{n-2} \ldots \Delta p_1^2 = \Delta p_1^1;$$

S3400) Calculate $$\Delta p_1^1$$

in each cycle:

S3410) When the grid frequency f is less than 50, $$\Delta p_1^1 = (50 - f) \times \overline{k_f};$$

S3420) When the grid frequency f is greater than 50, $$\Delta p_1^1 = (50 - f) \times \underline{k_f};$$

S3500) After n cycles, all the elements in the array are assigned or iterated;

Correct the plant active power set value every n calculation cycles according to the array $$[\Delta p_1^1, \Delta p_1^2 \ldots \Delta p_1^n];$$

Every n computation period, according [s(Δp_1^1", "& Δp_1^2 . . . Δp_1^n)] was carried out on the plant correction:

S3510) Calculate the corrected power $\Delta p_1$ of the tertiary frequency modulation high priority regulation mode, and $$\Delta p_1 = \frac{\sum_{i=1}^{n} \Delta p_1^i \times (n+1-i)}{\sum_{i=1}^{n} n+1-i};$$

$$\Delta p_1^i$$

element in the array;

Assume that the array length set in S3200 is 5, and $$\Delta p_1^1 \text{ to } \Delta p_1^5$$

are 100 MW, 100 MW, 200 MW, 200 MW and 100 MW respectively, then $$\Delta p_1 = \frac{100 \times 5 + 100 \times 4 + 200 \times 3 + 200 \times 2 + 100 \times 1}{5+4+3+2+1} = \frac{2000}{15} \approx 133.3 \text{ MW}.$$

S3520) If the corrected power $\Delta p_1$ is greater than 0, the plant active power set value is equal to min(plant active power set value+corrected power $\Delta p_1$, the upper limit of the plant active power is adjustable);

S3530) If the corrected power $\Delta p_1$ is less than 0, the plant active power set value is equal to max(plant active power set value+corrected power $\Delta p_1$, the lower limit of the plant active power is adjustable).

S3600) After obtaining the corrected plant active power set value, AGC modifies the active power set value of each unit and performs the active power closed-loop regulation in each unit.

Figure 5:
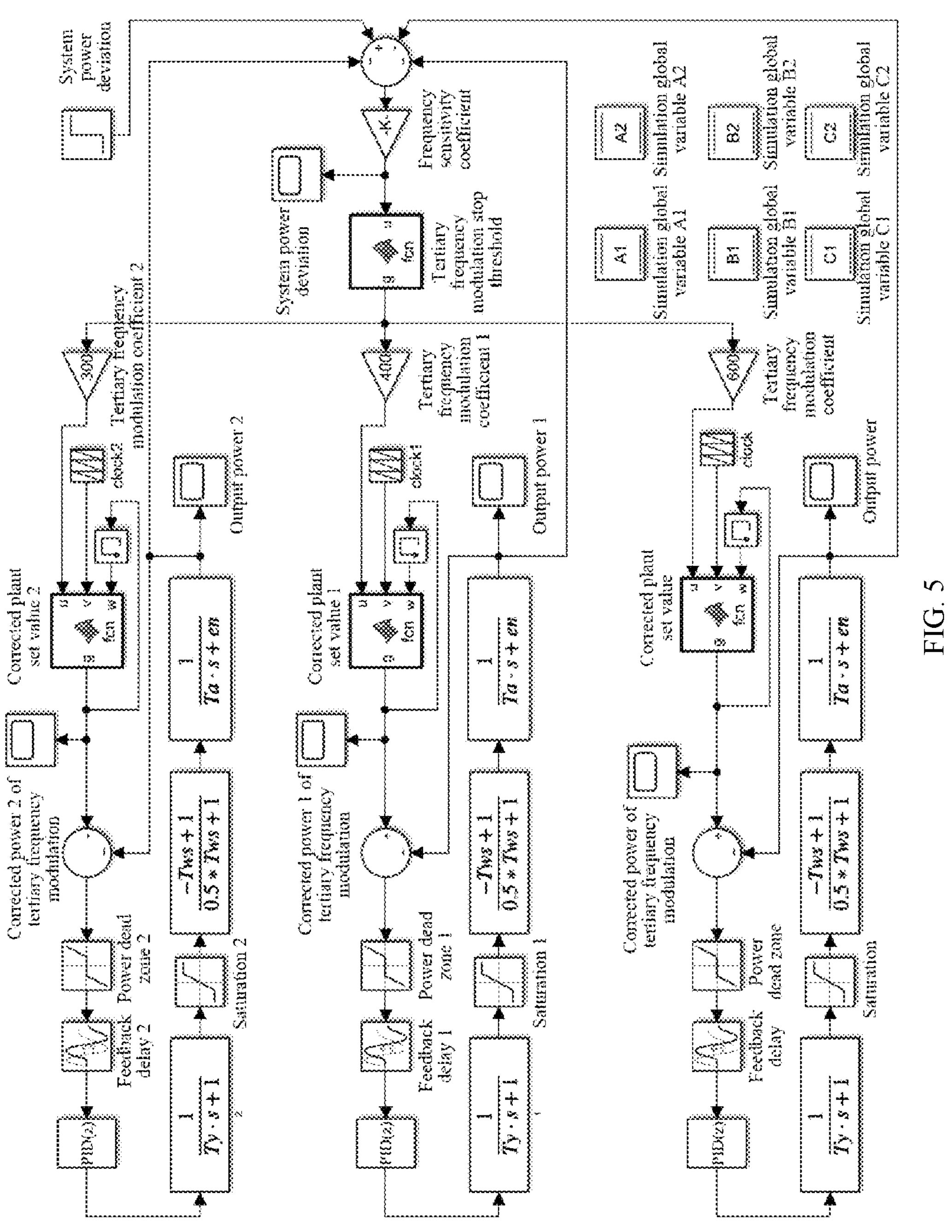
FIG. 5 is the simulation model of the tertiary frequency modulation high priority regulation mode in the invention.

The simulation model of the tertiary frequency modulation high priority regulation mode is shown in FIG. 5, in which $T_y$ is the response time constant of a servomotor; $T_w$ is the inertia time constant of the flow; $T_a$ is the inertia time constant of the unit (load); $T_f$ is the regulation feedback delay, reflecting the synchronization delay between the output power and the PID regulation signal, and including the measurement of the output power, the transmission time and the PID operation time; $e_n$ is the static frequency self-regulation (characteristic) coefficient of the unit (load); the plant set value correction function is to correct the plant active set value every 30 seconds based on the weighted average of the array $$[\Delta p_1^1, \Delta p_1^2 \ldots \Delta p_1^n].$$

Figure 6:
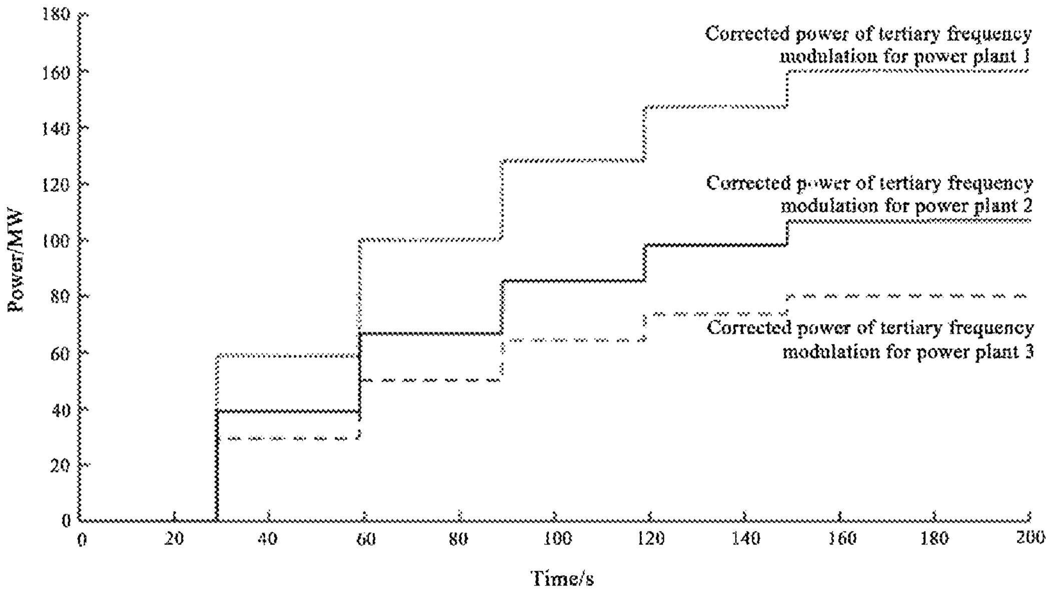
FIG. 6 shows the power simulation regulation effect of the tertiary frequency modulation high priority regulation mode in the invention.
Figure 7:
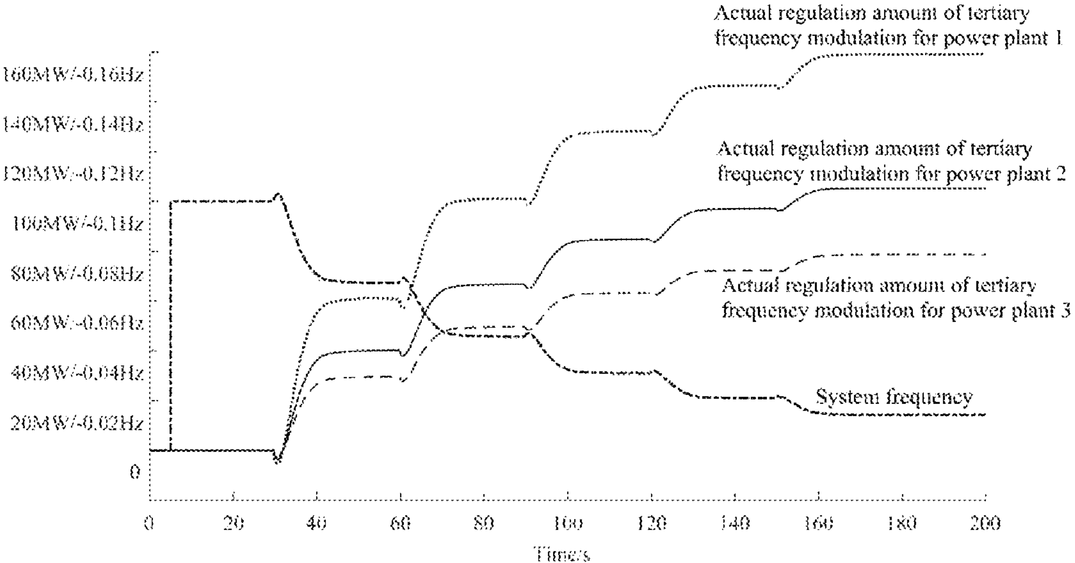
FIG. 7 shows the frequency simulation regulation effect of the tertiary frequency modulation high priority regulation mode in the invention.

In the embodiment, assume that three power plants participate in the grid tertiary frequency modulation, the regulation effect of the simulation model is shown in FIG. 6 and FIG. 7, from which it can be seen that the tertiary frequency modulation has a property of obvious iterative regulation.

Figure 8:
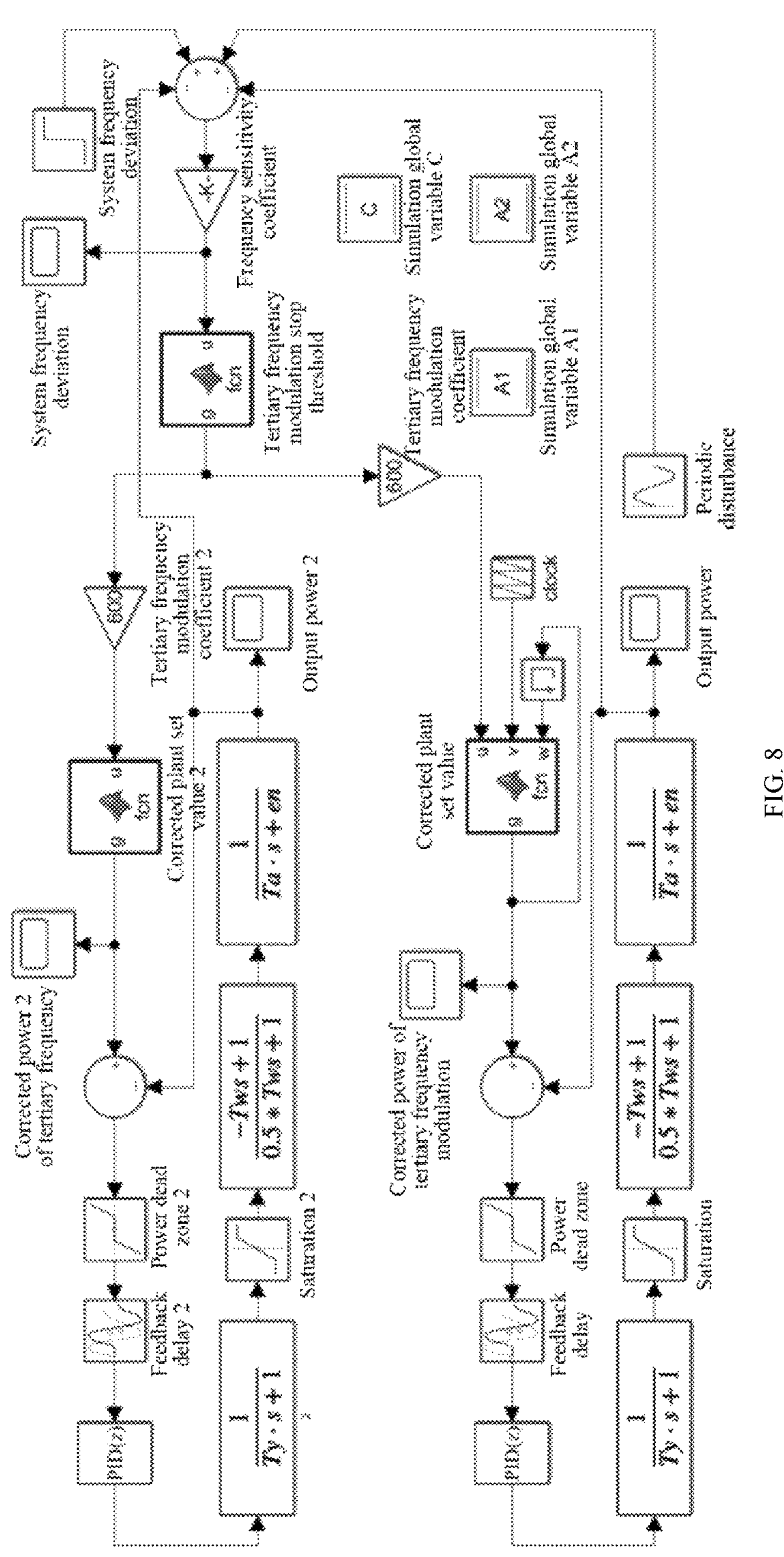
FIG. 8 is the simulation model for comparing the regulation effects of two different power calculation methods for tertiary frequency modulation.

To show the superiority of S3500 in obtaining the corrected power $\Delta p_1$ by taking the weighted average of the array $$[\Delta p_1^1, \Delta p_1^2 \ldots \Delta p_1^n],$$

a simulation model shown in FIG. 8 is established to compare the two methods for calculating the corrected power $\Delta p_1$. For the power plant 1, the regulation amount of tertiary frequency modulation is calculated by the method in S3400 every 30 seconds according to the frequency deviation of the power grid, and the plant active power set value is corrected according to the calculation result; for the power plant 2, the plant active power set value is corrected every 30 seconds according to the weighted average of the array $$[\Delta p_1^1, \Delta p_1^2 \ldots \Delta p_1^n].$$

Figure 9A:
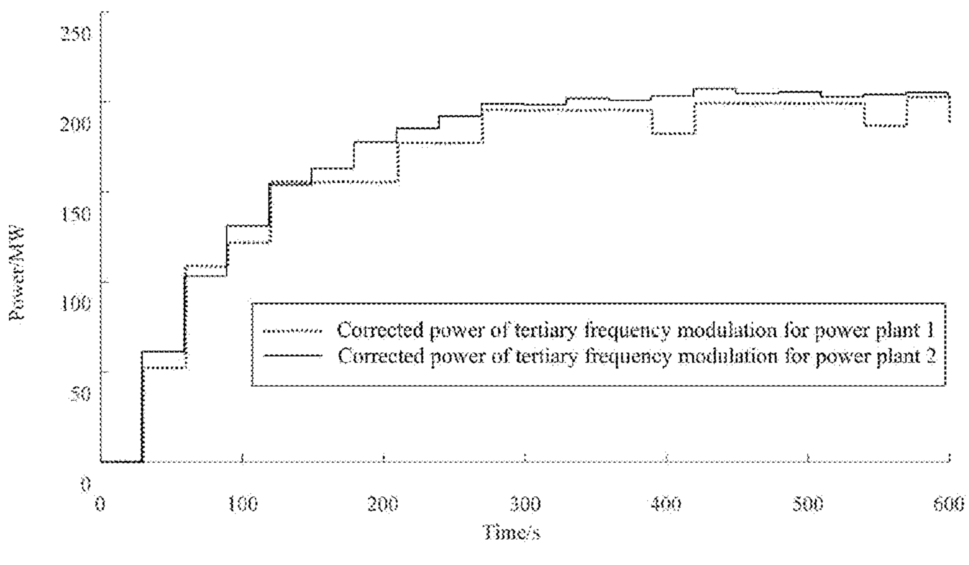
FIG. 9*a* and FIG. 9*b* respectively shows the comparison between power and frequency simulation regulation effects of different power calculation methods for tertiary frequency modulation.
Figure 9B:
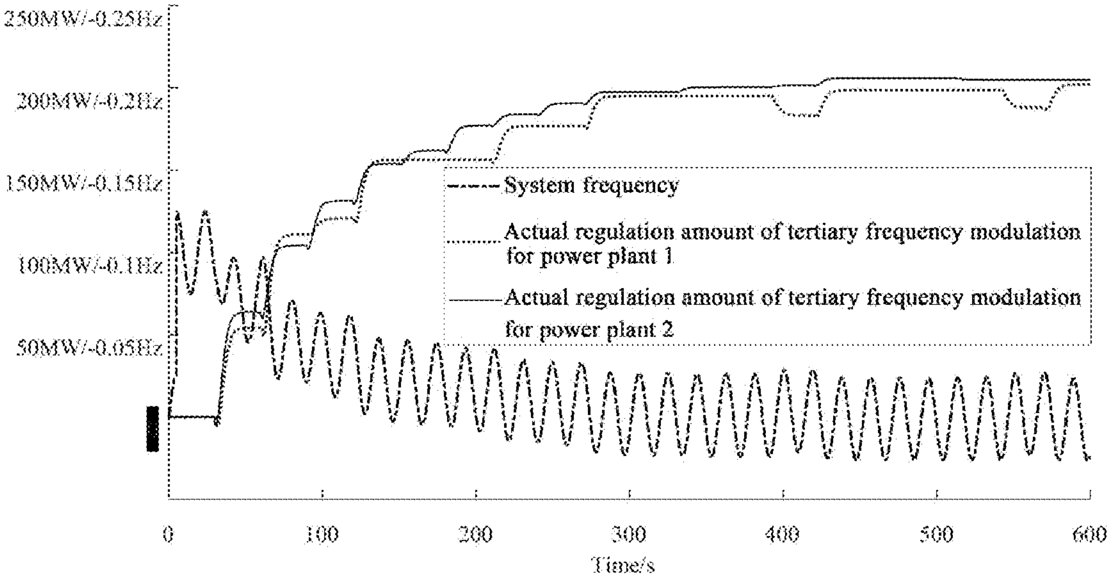

As shown in FIG. 9*a* and FIG. 9*b*, the effect and stability of the tertiary frequency modulation for the power plant 2 is superior to that for the power plant 1.

Figure 10:
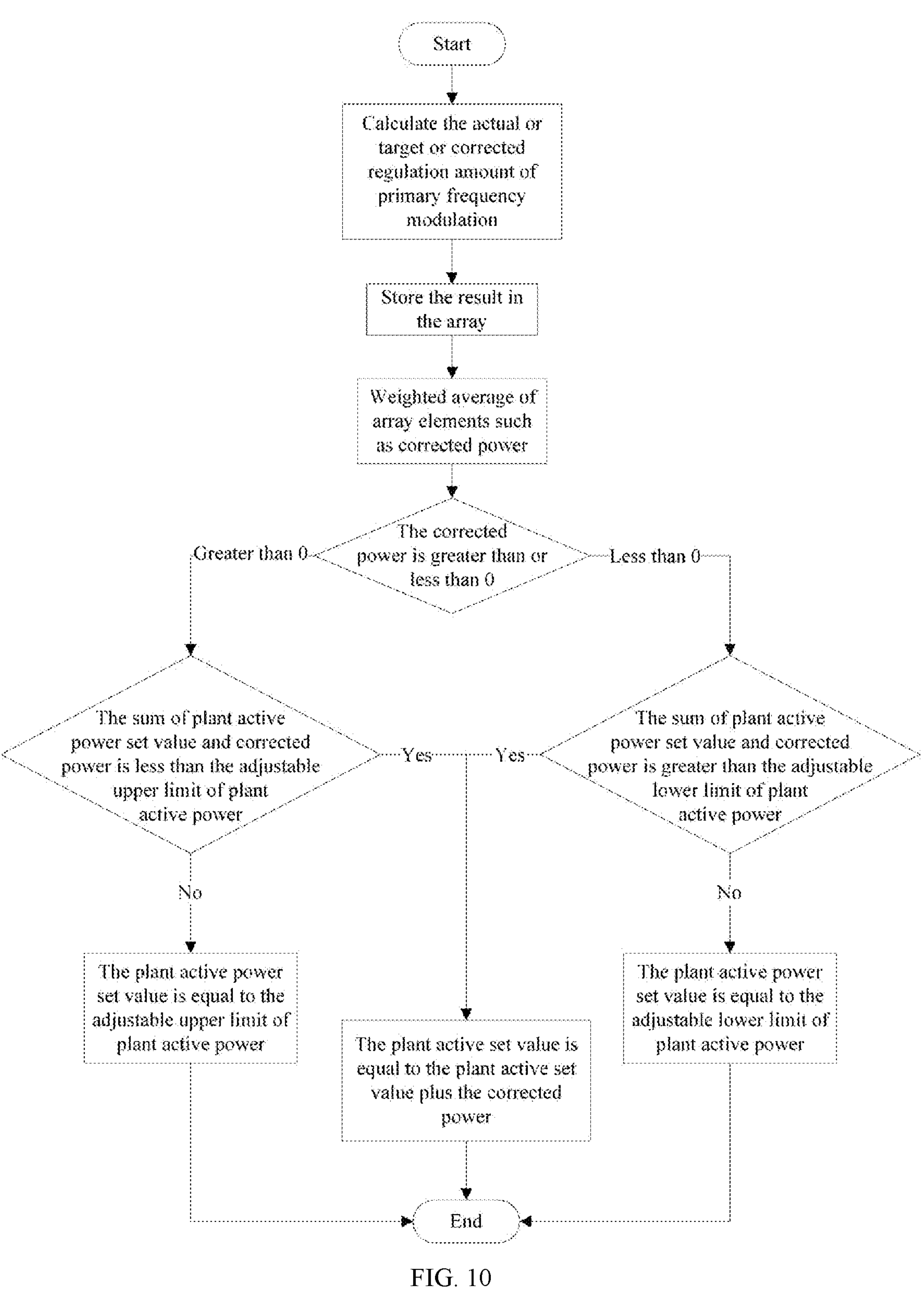
FIG. 10 is the sequential control logic diagram of the tertiary frequency modulation low priority regulation mode based on the regulation amount of primary frequency modulation in the invention.

As shown in FIG. 10, the regulation mechanism and strategy of the tertiary frequency modulation based on the regulation amount of primary frequency modulation in S4000) include:

S4100) Set an array $$[\Delta p_2^1, \Delta p_2^2 \ldots \Delta p_2^n]$$

containing n elements in the real-time monitoring system of the power plant, where n is a manually set parameter, n×TS is 2 to 3 times the time required for the power plant unit to complete an active power regulation, and the initial value of variables contained by the array is 0; TS is the AGC system cycle;

S4200) Assign a value to $$\Delta p_2^1$$

in each AGC system cycle, and assign values to all elements of the array in turn, so that $$\Delta p_2^n = \Delta p_2^{n-1} \text{ and } \Delta p_2^{n-1} = \Delta p_2^{n-2} \ldots \Delta p_2^2 = \Delta p_2^1;$$

S4300) Provide three alternative methods to assign values to $$\Delta p_2^1$$

in each cycle:

S4310) On the premise that the actual regulation amount of primary frequency modulation can be collected, assign the sum of the actual regulation amount of primary frequency modulation of all units in the generating state to $$\Delta p_2^1;$$

Or S4320) Assign values to $$\Delta p_2^1$$

using the target regulation amount of primary frequency modulation, including:

S4321) When the grid frequency f is greater than $50+\Delta f_3$, the target regulation amount of primary frequency modulation is equal to the total rated capacity of all units in the generating state multiplied by the power regulation coefficient of primary frequency modulation multiplied by $(50-f+\Delta f_3)$, where $\Delta f_3$ is the primary frequency modulation threshold;

S4322) When the grid frequency f is less than $50-\Delta f_3$, the target regulation amount of primary frequency modulation is equal to the total rated capacity of all units in the generating state multiplied by the power regulation coefficient of primary frequency modulation multiplied by $(50-f-\Delta f_3)$;

S4323) When the power grid frequency f is greater than $50-\Delta f_3$ and less than $50+\Delta f_3$, the target regulation amount of primary frequency modulation is equal to 0;

S4324)

$$\Delta p_2^1 =$$

is equal to the target regulation amount of primary frequency modulation; Or S4330) Assign values to $$\Delta p_2^1$$

using the corrected regulation amount of primary frequency modulation:

When the power grid frequency f is greater than $50+\Delta f4$, the corrected regulation amount of primary frequency modulation is equal to the total rated capacity of all units in the generating state multiplied by the power regulation coefficient of primary frequency modulation multiplied by $(50-f+\Delta f4)\times k1$, where $\Delta f4$ and k1 are manually set parameters, $0<\Delta f4<\Delta f3$, and $0<k1<1$; the purpose of setting $\Delta f_4$ is to improve the deviation correction of the tertiary frequency modulation function, the purpose of setting $k_1$ is to suppress the increase of regulation amount caused by $\Delta f_4$ less than $\Delta f_3$;

S4332) When the power grid frequency f is less than $50-\Delta f_4$, the corrected regulation amount of primary frequency modulation is equal to the total rated capacity of all units in the generating state multiplied by the power regulation coefficient of primary frequency modulation multiplied by $(50-f-\Delta f_4)\times k_1$;

S4333) When the power grid frequency f is greater than $50-\Delta f_4$ and less than $50+\Delta f_4$, the corrected regulation amount of primary frequency modulation is equal to 0;

S4334)

$$\Delta p_2^1 =$$

is equal to the corrected regulation amount of primary frequency modulation.

S4340) When the actual regulation amount of primary frequency modulation is used, set $\Delta f_3<\Delta f_5$, where $\Delta f_5$ is the stop threshold of tertiary frequency modulation;

S4350) Set $\Delta f_3 < \Delta f_5$ when the target regulation amount of primary frequency modulation is used for calculation;

S4360) Set $\Delta f_4 < \Delta f_5$ when the corrected regulation amount of primary frequency modulation is used for calculation.

S4400) After n cycles, all the elements in the array are assigned or iterated;

Correct the plant active power set value every n calculation cycles according to the array $$[\Delta p_2^1, \Delta p_2^2 \ldots \Delta p_2^n]:$$

S4410) Calculate the corrected power Δp2:

$$\Delta p_2 = \frac{\sum_{i=1}^{n} \Delta p_2^i \times (n+1-i)}{\Sigma_{i=1}^{n} n+1-i},$$

and $$\Delta p_2^i$$

is the $i^{th}$ element in the array;

Assume that the array length set in S4100 is 5, and $$\Delta p_2^1 \text{ to } \Delta p_2^5$$

are 100 MW, 100 MW, 200 MW, 200 MW and 100 MW respectively, then:

$$\Delta p_2 = \frac{100 \times 5 + 100 \times 4 + 200 \times 3 + 200 \times 2 + 100 \times 1}{5+4+3+2+1} = \frac{2000}{15} \approx 133.3 \text{ MW}.$$

S4420) If the corrected power $\Delta p_2$ is greater than 0, the plant active power set value is equal to min(plant active power set value+corrected power $\Delta p_2$, the upper limit of the plant active power is adjustable);

S4430) If the corrected power $\Delta p_2$ is greater than 0, the plant active power set value is equal to min(plant active power set value+corrected power $\Delta p_2$, the lower limit of the plant active power is adjustable).

S4500) After obtaining the plant active power set value, AGC modifies the active power set value for each unit according to the inherent logic, and performs the active power closed-loop regulation for each unit.

Figure 11:
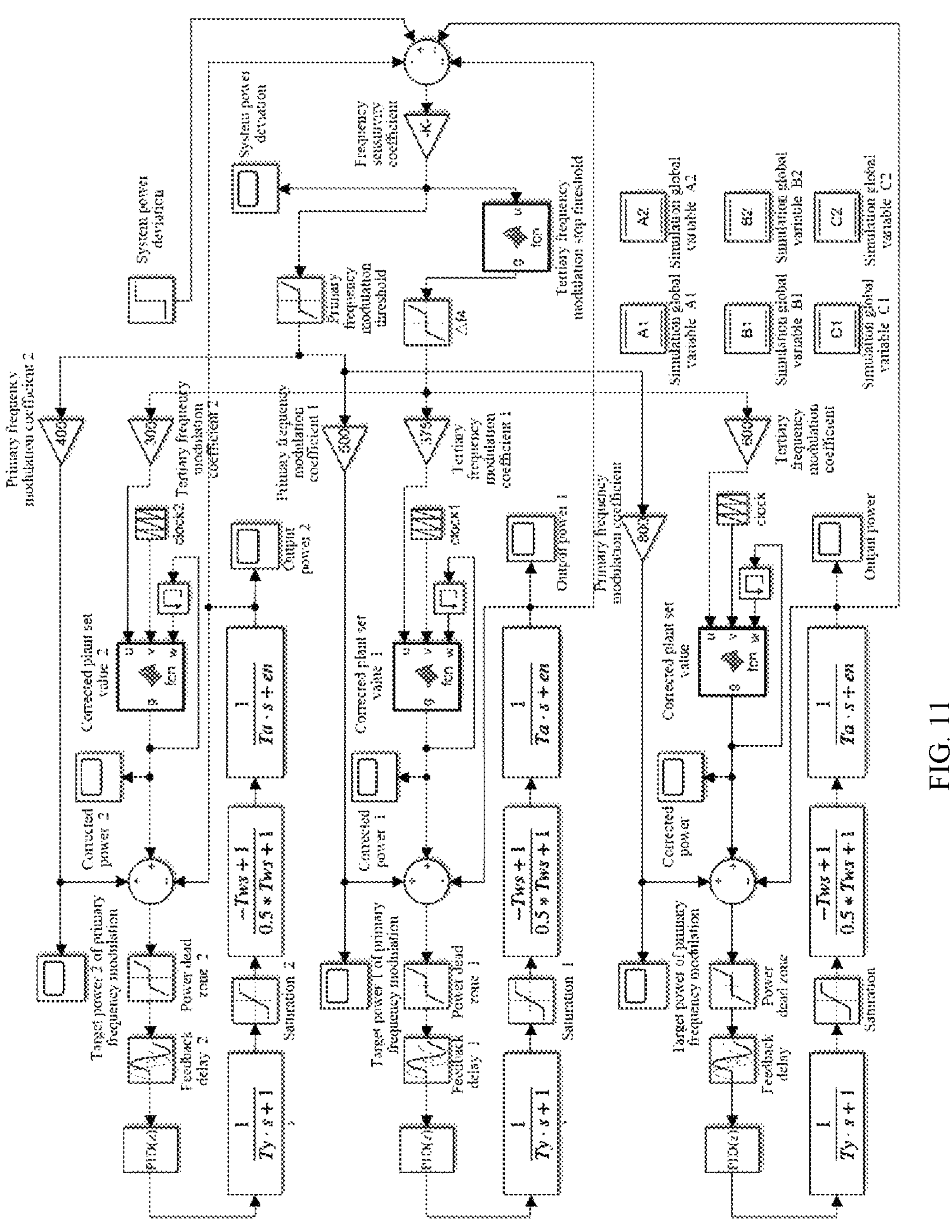
FIG. 11 is the simulation model of the tertiary frequency modulation low priority regulation mode based on the regulation amount of primary frequency modulation in the invention.

The simulation model of the tertiary frequency modulation low priority regulation mode based on regulation amount of primary frequency modulation in the invention is shown in FIG. 11, in which $T_y$ is the response time constant of the servomotor; $T_w$ is the inertia time constant of the flow; $T_a$ is the inertia time constant of the unit (load); $T_f$ is the regulation feedback delay, reflecting the synchronization delay between the output power and the PID regulation signal, and including the measurement of the output power, the transmission time and the PID operation time; $e_n$ is the static frequency self-regulation (characteristic) coefficient of the unit (load); the plant set value correction function is to correct the plant active set value every 30 seconds based on the weighted average of the array $$[\Delta p_1^1, \Delta p_1^2 \ldots \Delta p_1^n].$$

Figures 12, 13:
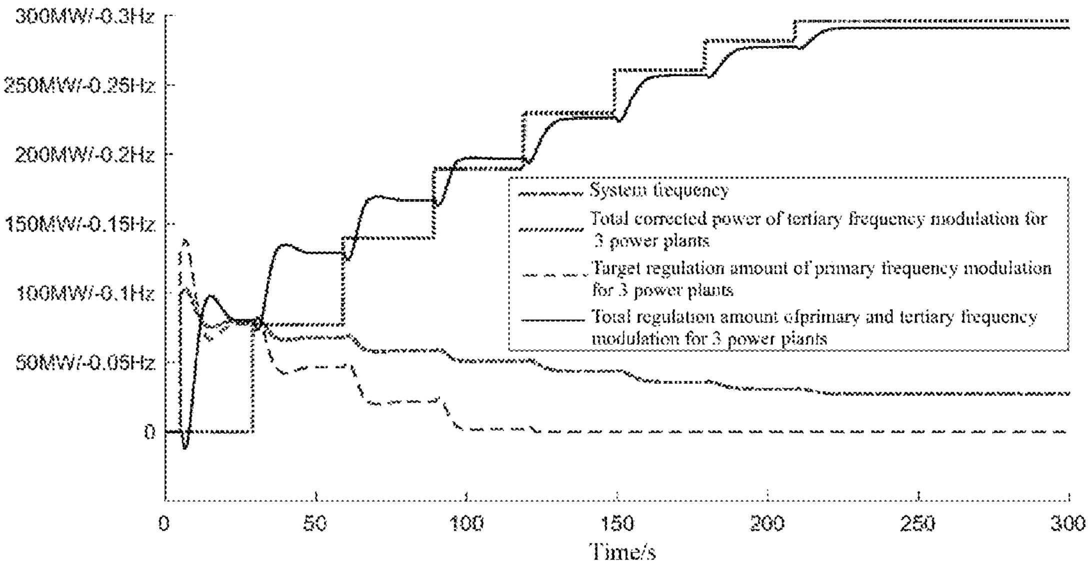
FIG. 12 shows the simulation regulation effect of the tertiary frequency modulation low priority regulation mode based on the regulation amount of primary frequency modulation in the invention.
FIG. 13 shows the simulation regulation effect of single action of the primary frequency modulation.

In the embodiment, assume that three power plants participate in the grid primary and tertiary frequency modulation, use the method described in S4330 that $$\Delta p_2^1$$

is calculated using the regulation amount of primary frequency modulation, and set $\Delta f_4$ to 0.02 Hz and $k_1$ to 0.5, then the regulation effect of the common action of primary frequency modulation and tertiary frequency modulation is shown in FIG. 12, and the regulation effect of the single action of primary frequency modulation is shown in FIG. 13. FIG. 12 and FIG. 13 show that when primary frequency modulation and tertiary frequency modulation work together, the regulation effect of primary frequency modulation is gradually replaced by the tertiary frequency modulation, and the system frequency can be eventually regulated without deviation; when the primary frequency modulation works alone, the regulation effect of primary frequency modulation is always maintained, and the system frequency can only be regulated with deviation.

Figure 14:
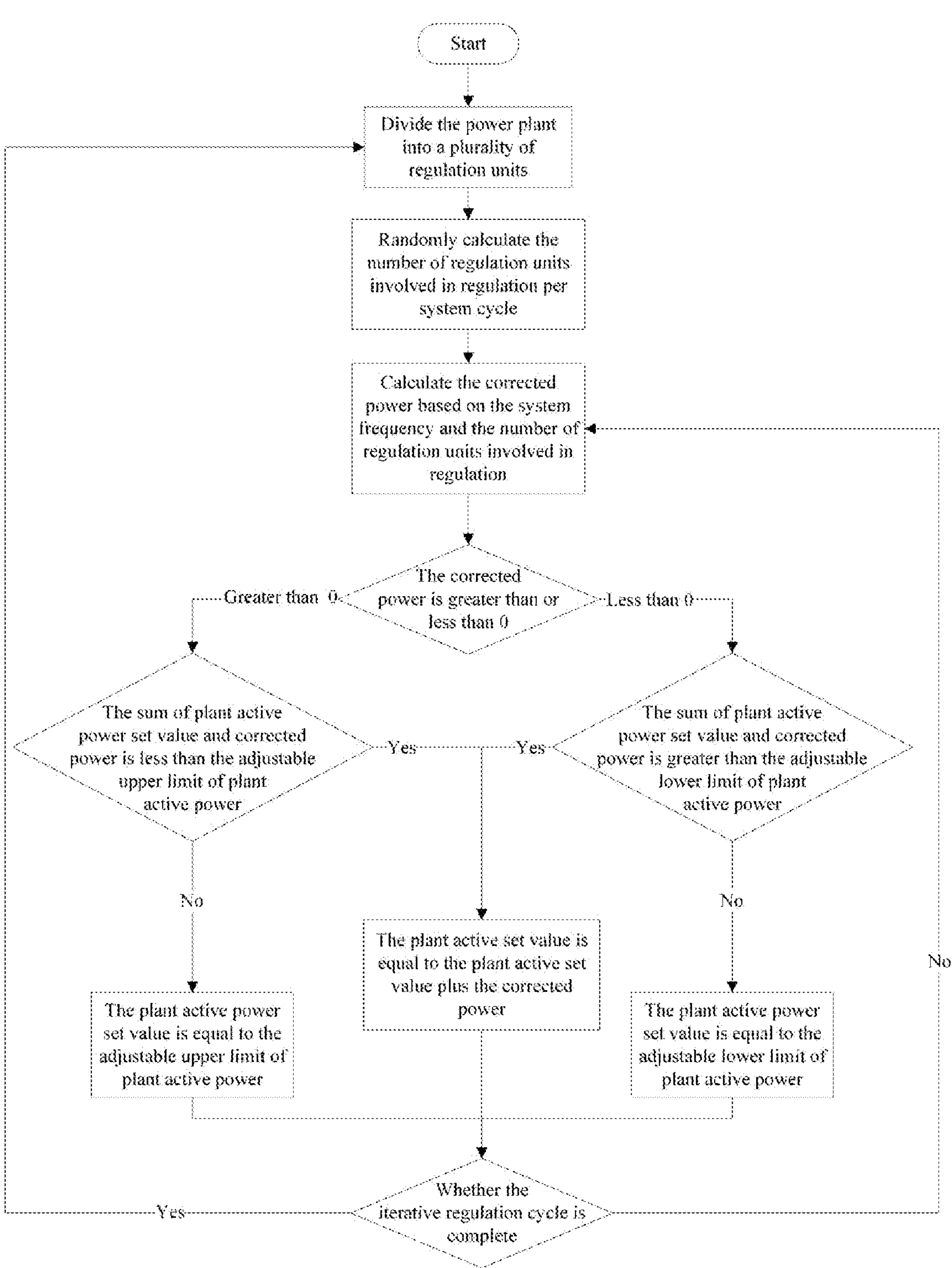
FIG. 14 is the sequential control logic diagram of the tertiary frequency modulation low priority regulation mode based on random probability in the invention.

As shown in FIG. 14, the regulation mechanism and strategy of tertiary frequency modulation based on random probability in S5000 include the following operations:

S5100) Divide n AGC system cycles into an iterative regulation cycle, where n is the manually set parameter, and n×TS is 2 to 3 times the time required for the power plant unit to complete an active power regulation; TS is the AGC system cycle;

S5200) Perform the following operations in the first system cycle of each iteration adjustment cycle, including:

S5210) Calculate the number m of segmented units of the power plant participating in the tertiary frequency modulation, m approximates the actual plant active power divided by the capacity β of segmented units; assuming that the actual output value of the plant active power is 320 MW and the capacity β of the segmented units is 30 MW, 320/30=10.67, and m is the natural number 11 closest to 10.67;

S5220) Set an array U=[u1, u2 . . . um] containing m elements, and then set an array containing 11 elements [u1, u2 . . . u11] in the embodiment;

S5230) With values ranging from 1 to n, m random integers greater than or equal to 1 and less than or equal to n are generated, and assigned to the elements of the array U in turn; assuming that n is 5, 11 random numbers greater than or equal to 1 and less than or equal to 5 are generated in the embodiment, assuming to be 5, 1, 5, 4, 3, 3, 2, 3, 5, 3 and 3 respectively;

S5240) Make statistics on the number γ of elements equal to 1 in the array U; in the embodiment, the number of elements equal to 1 in the array U is 1;

S5250) Calculate the corrected power $\Delta p_3$, including:

S5251) When the power grid frequency f is greater than $50+\Delta f_4$, $\Delta p_3=(50-f+\Delta f_4)\times\beta\times\gamma\times k_2$, where $k_2$ is the manually set power adjustment coefficient of tertiary frequency modulation, $\Delta f_4$ is the manually set parameter, $0<\Delta f_4<\Delta f_3$, and $k_2$ is greater than 0 and less than or equal to the power adjustment coefficient of primary frequency modulation;

Assume that f is 50.05 Hz, $\Delta f_4$ is 0.01 Hz, the capacity $\beta$ of segmented unit is 30 MW according to S3210, $k_2$ is 20/Hz, and $\gamma$ is 1 according to S5240, then $\Delta p_3=(50-50.05+0.01)\times 30\times 1\times 20=-0.04\times 30\times 1\times 20=-24$ MW;

S5252) When the grid frequency f is less than $50-\Delta f_4$, $\Delta p_3=(50-f-\Delta f_4)\times\times\gamma\times k_2$;

S5253) When the grid frequency f is greater than $50-\Delta f_4$ and less than $50+\Delta f_4$, $\Delta p_3$ is equal to 0.

S5260) Correct the AGC plant active power set value, including:

S5261) If the corrected power $\Delta p_3$ is greater than 0, the plant active power set value is equal to min(plant active power set value+corrected power $\Delta p_3$, the upper limit of the plant active power is adjustable);

S5262) If the corrected power $\Delta p_3$ is less than 0, the plant active power set value is equal to max(plant active power set value+corrected power $\Delta p_3$, the lower limit of the plant active power is adjustable).

S5270) Subtract the values of all the elements in the array U by 1, i.e., u1=u1−1, u2=u2−1 . . . um=um−1; in the embodiment, the elements in the array U [5, 1, 5, 4, 3, 3, 2, 3, 3, 5, 3, 3] are equal to [4, 0, 4, 4, 2, 2] respectively after being subtracted by 1;

S5300) Perform the following operations from the second system cycle to the $n^{th}$ system cycle of each iterative regulation cycle, including:

S5310) Make statistics on the number $\gamma$ of elements equal to 1 in the array U; assuming that the elements of the array U in the third system cycle are [3, −1, 3, 2, 1, 1, 0, 1, 3, 1, 1], $\gamma$ is equal to 4;

S5320) Calculate the corrected power $\Delta p_3$, including:

S5321) When the power grid frequency f is greater than $50+\Delta f_4$, $\Delta p_3=(50-f+\Delta f_4)\times\beta\times\gamma\times k_2$, where $k_2$ is the manually set power adjustment coefficient of tertiary frequency modulation, $\Delta f_4$ is the manually set parameter, $0<\Delta f_4<\Delta f_3$, and $k_2$ is greater than 0 and less than or equal to the power adjustment coefficient of primary frequency modulation;

Assume that f is 50.05 Hz, $\Delta f_4$ is 0.01 Hz, the capacity $\beta$ of segmented unit is 30 MW according to S3210, $k_2$ is 20/Hz, and $\gamma$ is 4 according to S5310, then $\Delta p_3=(50-50.05+0.01)\times 30\times 4\times 20=-0.04\times 30\times 4\times 20=-96$ MW;

S5322) When the grid frequency f is less than $50-\Delta f_4$, $\Delta p_3=(50-f-\Delta f_4)\times\beta\times\gamma\times k_2$;

S5323) When the grid frequency f is greater than $50-\Delta f_4$ and less than $50+\Delta f_4$, $\Delta p_3$ is equal to 0.

S5330) Correct the AGC plant active power set value, including:

S5331) If the corrected power $\Delta p_3$ is greater than 0, the plant active power set value is equal to min(plant active power set value+corrected power $\Delta p_3$, the upper limit of the plant active power is adjustable);

S5332) If the corrected power $\Delta p_3$ is less than 0, the plant active power set value is equal to max(plant active power set value+corrected power $\Delta p_3$, the lower limit of the plant active power is adjustable).

After obtaining the corrected plant active power set value, AGC modifies the active power set value of each unit and performs the active power closed-loop regulation in each unit;

S5340) Subtract the values of all the elements in the array U by 1, i.e., u1=u1−1, u2=u2−1 . . . um=um−1.

S5400) After the $n^{th}$ system cycle is executed, go to Step S5200 and start the next iteration cycle.

Figure 15:
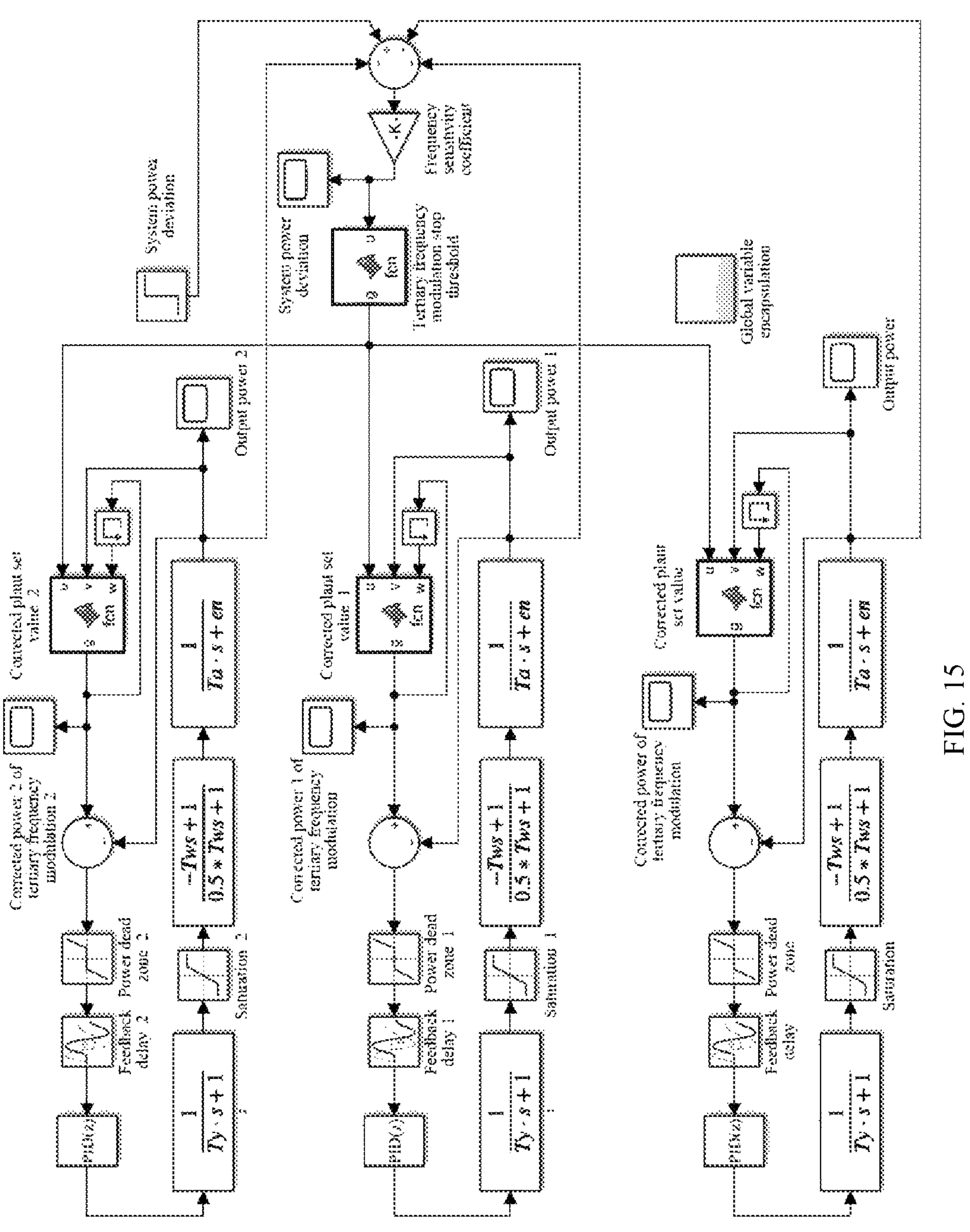
FIG. 15 is the simulation model of the tertiary frequency modulation low priority regulation mode based on random probability in the invention.

The simulation model of the tertiary frequency modulation low priority regulation mode is shown in FIG. 15, in which $T_y$ is the response time constant of a servomotor; $T_w$ is the inertia time constant of the flow; $T_a$ is the inertia time constant of the unit (load); $T_f$ is the regulation feedback delay, reflecting the synchronization delay between the output power and the PID regulation signal, and including the measurement of the output power, the transmission time and the PID operation time; $e_n$ is the static frequency self-regulation (characteristic) coefficient of the unit (load); the plant set value correction function is to execute the functions described in S5200 to S5300.

Figure 16A:
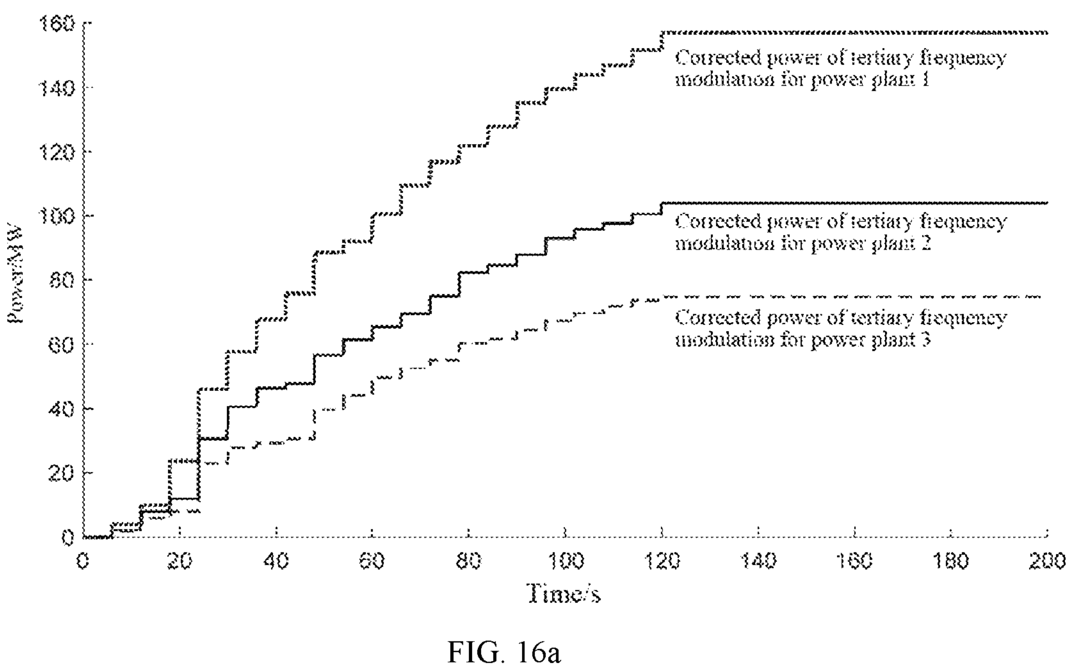
FIG. 16*a* and FIG. 16*b* respectively show the power and frequency simulation regulation effects of the tertiary frequency modulation low priority regulation mode based on random probability in the invention.
Figure 16B:
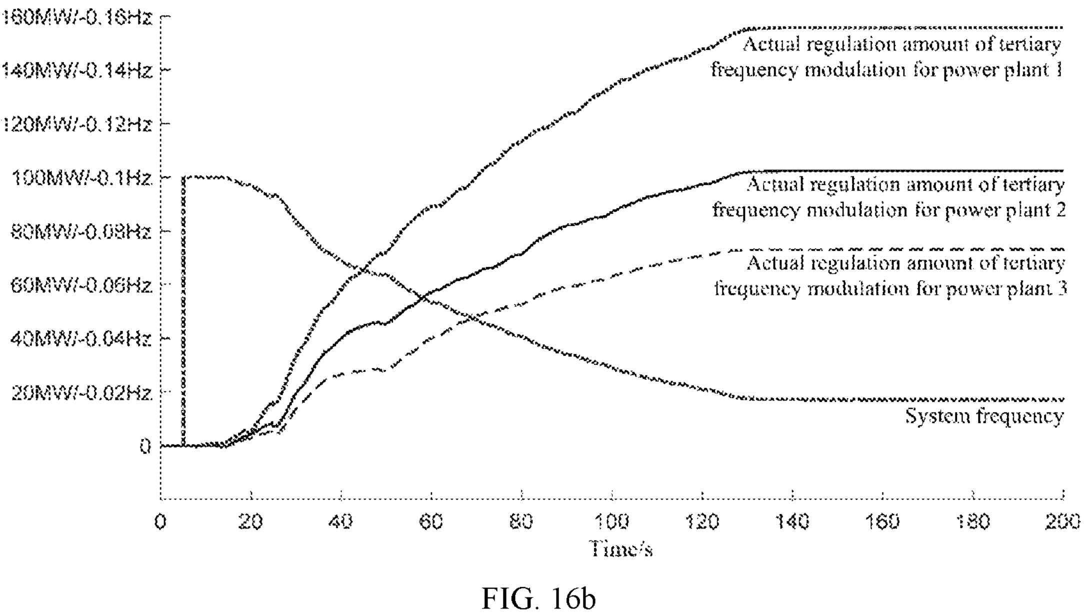

In the embodiment, assume that three power plants participate in the grid tertiary frequency modulation, the capacity $\beta$ of segmented units is 10 MW, and the actual active power outputs of the three power plants are about 600 MW, 400 MW and 300 MW respectively before tertiary frequency modulation, then the simulation regulation effect of tertiary frequency modulation is shown in FIG. 16*a* and FIG. 16*b*. Compared with FIG. 6, FIG. 7 and FIG. 12, although the logical design of tertiary frequency modulation low priority regulation mode based on random probability is more complex than that of other regulation modes, the regulation effect is also smoother and more stable.

Figure 17:
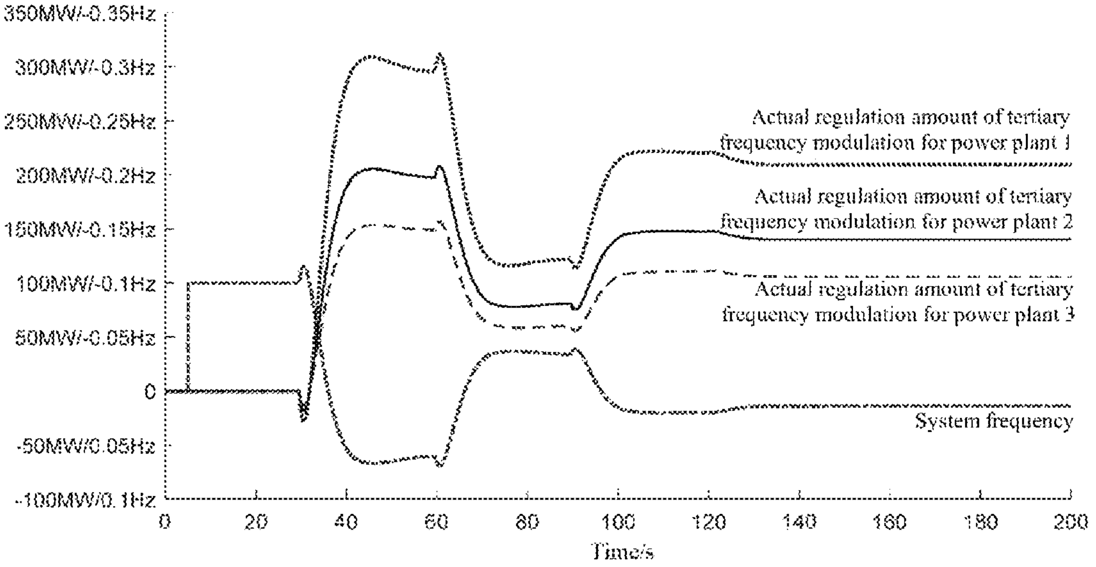
FIG. 17 shows the simulation regulation effect of the high priority regulation mode at 5× regulation coefficient.
Figure 18:
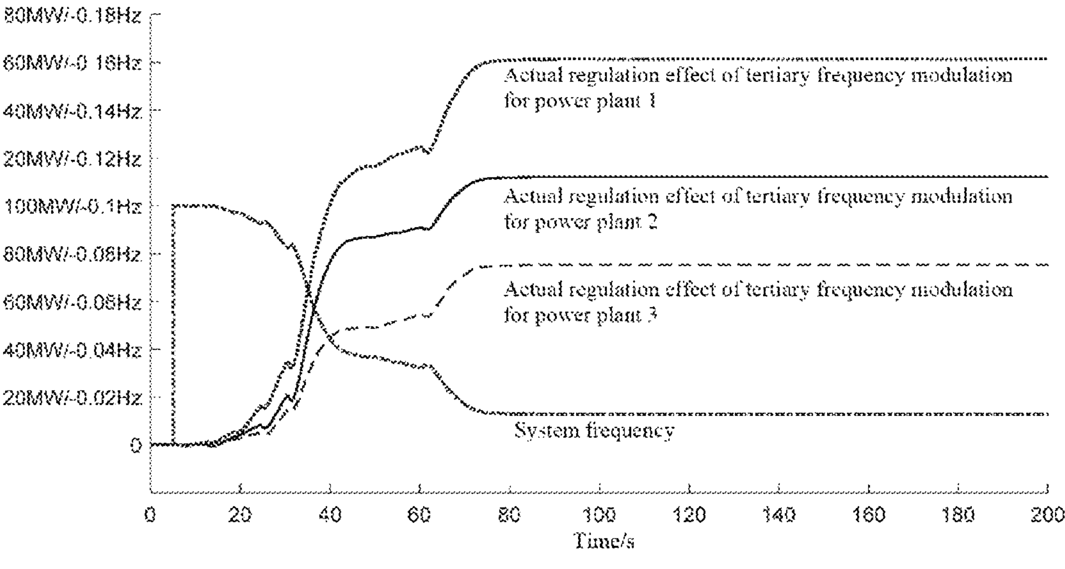
FIG. 18 shows the simulation regulation effect of the priority regulation mode based on random probability at 5× regulation coefficient.

To show the superiority of the tertiary frequency modulation low priority regulation mode based on random probability to other regulation modes in prevention of tertiary frequency modulation overshoot and system oscillation caused by overshoot, the simulation regulation is performed after the regulation coefficients of the simulation models for the tertiary frequency modulation high priority regulation mode and the tertiary frequency modulation low priority regulation mode based on random probability are amplified by 5 times in the same proportion, and the regulation effects are shown in FIG. 17 and FIG. 18 respectively. It can be seen that the tertiary frequency modulation low priority regulation mode based on random probability in the invention shows very high regulation stability under the assumed working condition that the frequency modulation function is overshot due to the mismatch between the setting of the frequency modulation parameter and the actual working condition of the power system, effectively avoiding the possibility of ultra-low frequency oscillation of the power system caused by overshoot.

When the grid frequency deviation falls back or the AGC state change reaches the stop trigger condition, stop the tertiary frequency modulation. The tertiary frequency modulation stop is described in detail below.

S6000) The trigger conditions of tertiary frequency modulation stop include:

S6100) When the tertiary frequency modulation is in the starting state, stop the tertiary frequency modulation if any of the following conditions in S6200 to S6700 are met; S6200) Compare the absolute value of the system frequency deviation with the tertiary frequency modulation stop threshold $\Delta f_5$; if $|f-50|<\Delta f_5$, the tertiary frequency modulation function will be stopped, where $\Delta f_5$ is a manually set parameter and less than the tertiary frequency modulation start threshold $\Delta f_1$;

The logic of S6200 is designed to prevent the tertiary frequency modulation from participating in the regulation under the condition of system frequency oscillation and from failing to stop regulating.

S6300) Judge whether AGC is put into use in the power plant; if not, stop the tertiary frequency modulation function;

S6400) Judge whether AGC is put into use in the unit; if not, stop the tertiary frequency modulation function;

Tertiary frequency modulation is active power regulation based on the AGC function of the power plant. Therefore, as described in S6300 and S6400, the necessary condition for the tertiary frequency modulation is that the AGC function of the power plant can play a normal role.

S6500) Judge whether a new AGC regulation instruction is received; if yes, stop the tertiary frequency modulation function;

The tertiary frequency modulation regulation of the invention is spontaneous regulation deployed in the automatic control system of the power plant, and is originally designed to automatically correct the frequency deviation of the grid system when the secondary frequency modulation of the dispatching mechanism or the manual regulation of the power plant does not work for a long time. Since both the tertiary frequency modulation and the secondary frequency modulation of the dispatching mechanism or the manual regulation of the power plant focus on the plant active power set value, it is possible to cause conflict, offset or other unpredictable abnormal conditions in case of simultaneous regulation, so the three regulation modes are defined as mutually exclusive relations in engineering design, that is, the AGC regulation source is set to receive secondary frequency modulation instructions only on the dispatching side or receive the instructions of the plant operator only on the power plant side; the mechanism described in S6500 ensures that the tertiary frequency modulation cannot work together with the above two regulation modes.

S6600) Judge whether the frequency modulation function is in use or exit state; If in exit state, stop the frequency modulation function;

S6700) Judge whether the high priority adjustment mode of tertiary frequency modulation is available, and stop the tertiary frequency modulation if the high priority regulation mode is not available and the trigger accumulation parameter s for tertiary frequency modulation is less than the trigger threshold in the tertiary frequency modulation low priority regulation mode.

The logic design of S6700 is to ensure that the regulation resources of the prearranged secondary frequency modulation power plant are preferentially utilized to better meet the safety conditions such as load flow constraints of the power system if the tertiary frequency modulation is required.

The invention claimed is:

1. A tertiary frequency modulation method for a power system, characterized in that Automatic Generation Control (AGC) based on power plant input performs active power regulation for tertiary frequency modulation in following modes in power plants in case of secondary frequency modulation failure of the power system and unidirectional deviation of grid frequency from rated frequency for a period:

tertiary frequency modulation mode based on reserved capacity of secondary frequency modulation: if adjustable capacity is reserved for the secondary frequency modulation in the power plant, and an absolute deviation between an active power set value and an active power planned value of the power plant is smaller than the reserved capacity of secondary frequency modulation, correct the active power set value in a cyclic iterative manner based on the reserved capacity of secondary frequency modulation and the tertiary frequency modulation coefficient;

or tertiary frequency modulation mode based on a regulation amount of primary frequency modulation: obtain the regulation amount of primary frequency modulation according to an actual regulation amount of primary frequency modulation, a target regulation amount of primary frequency modulation or a corrected regulation amount of primary frequency modulation, assign the regulation amount of primary frequency modulation to an element in an array, and correct a plant active power set value according to a weighted average after several cycles;

or tertiary frequency modulation mode based on random parameters: equally segment an actual output value of plant active power, generate random numbers by a real-time monitoring system according to a number of segmented units, and assign the random numbers to each element in the array in turn; obtain a corrected power according to the grid frequency deviation, capacity of segmented units, a number of specified values in the array and a preset power regulation factor of tertiary frequency modulation in each cycle, and correct the plant active power set value according to the corrected power;

after the corrected active power set values of the plant are obtained in each mode, AGC modifies the active power set value of each unit and performs closed-loop active power regulation for each unit;

when the grid frequency deviation falls back or AGC state changes reach a stop trigger condition, stop tertiary frequency modulation.

2. The tertiary frequency modulation method for the power system according to claim 1, characterized by determining whether the tertiary frequency modulation is put into use and selecting the mode to be used:

1) set the parameters used to determine whether the tertiary frequency modulation is self-started:

among the three modes, the tertiary frequency modulation mode based on the reserved capacity of secondary frequency modulation is a high priority regulation mode; the tertiary frequency modulation mode based on the regulation amount of primary frequency modulation and the tertiary frequency modulation mode based on random parameters are low priority regulation modes, one of which is selected to implement the low priority modulation mode;

trigger thresholds are set for the three modes respectively, and the trigger threshold of the low priority regulation mode is higher than that of the high priority regulation mode;

set a starting threshold value $\Delta f_1$, and $\Delta f_1 \geq \Delta f_3$, where $\Delta f_3$ is the threshold of primary frequency modulation;

set a trigger accumulation parameter s for tertiary frequency modulation, and judge whether the trigger accumulation parameter is reset in each AGC system cycle; if not, accumulate;

set a stop threshold value $\Delta f_5$ for tertiary frequency modulation, and $\Delta f_5 < \Delta f_1$;

2) compare the trigger accumulation parameter for tertiary frequency modulation with the trigger threshold frequency modulation in each AGC system cycle:

S2410) if the trigger accumulation parameter s is less than the trigger threshold in the tertiary frequency modulation high priority regulation mode, the tertiary frequency modulation will not be started;

S2420) if the trigger accumulation parameter s is greater than in the tertiary frequency modulation high priority regulation mode, but less than the trigger threshold in the tertiary frequency modulation low priority regulation mode, judge the regulation mode used for the tertiary frequency modulation:

S2421) if the tertiary frequency modulation is in high priority regulation mode, the tertiary frequency modulation will be started;

S2422) if the tertiary frequency modulation is in low priority regulation mode, the tertiary frequency modulation will not be started;

S2430) if the trigger accumulation parameter s is greater than the trigger threshold in the tertiary frequency modulation low priority regulation mode, the tertiary frequency modulation will be started;

after the tertiary frequency modulation is started and regulated, stop the tertiary frequency modulation if the high priority regulation mode is not available and the trigger accumulation parameter s for tertiary frequency modulation is less than the trigger threshold in the tertiary frequency modulation low priority regulation mode.

3. The tertiary frequency modulation method for the power system according to claim 2, characterized by judging the resetting of trigger accumulation parameter s and accumulating:

1) in each AGC system cycle, the resetting conditions of the trigger accumulation parameter s are judged as follows:

S2210) compare the absolute value of the grid frequency deviation with the starting threshold value $\Delta f_1$ for the tertiary frequency modulation; if $|f-50|<\Delta f_1$, reset the trigger accumulation parameter s, where f is the grid frequency;

S2220) judge whether AGC is put into use in the power plant; if not, reset the trigger accumulation parameter s;

S2230) judge whether AGC is put into use in the unit; if not, reset the trigger accumulation parameter s;

S2240) judge whether a new AGC regulation instruction is received; if yes, reset the trigger accumulation parameter s;

S2250) judge whether the tertiary frequency modulation is in use or exit state; if in exit state, reset the trigger accumulation parameter s;

S2260) if the conditions of S2210 to S2250 are not met, the trigger accumulation parameter s for the tertiary frequency modulation will not be reset;

2) in each AGC system cycle, the trigger accumulation parameter is accumulated as follows:

S2310) compare the absolute value of the system frequency deviation collected in the current cycle with that collected in the previous cycle:

S2311) if the absolute value of the system frequency deviation in the current cycle is less than that in the previous cycle, that is, $|f-50|<|f'-50|$, skip the following subsequent steps and keep the trigger accumulation parameter s unchanged, wherein, f' is the grid frequency collected in the previous cycle;

S2312) if the absolute value of the system frequency deviation in the current cycle is greater than that in the previous cycle, that is, $|f-50|\geq|f'-50|$, execute S2320 and accumulate the trigger accumulation parameter s for the tertiary frequency modulation;

S2320) accumulate the trigger accumulation parameter s for the tertiary frequency modulation according to the system frequency deviation and integration time:

S2321) a theoretical calculation formula for accumulating the trigger accumulation parameter s for the tertiary frequency modulation is $s=s+\int(f-50-\Delta f_2)dt$, where $\Delta f_2$ is the artificially set constant, satisfying $0<\Delta f_2<\Delta f_1$, and dt is the time integral;

S2322) an actual calculation formula for accumulating the trigger accumulation parameter s for the tertiary frequency modulation is $s=s+(|f-50|-\Delta f2)\times TS$, where TS is the cycle time if the AGC system has a constant calculation cycle, or TS is the average cycle time or estimated cycle time if the AGC system has no constant calculation cycle.

4. The tertiary frequency modulation method for the power system according to claim 2, characterized in that the tertiary frequency modulation can be switched between the high priority regulation mode and the low priority regulation mode:

S1310) during the use of tertiary frequency modulation, select the high priority regulation mode for the tertiary frequency modulation if available;

S1320) during the use of tertiary frequency modulation, select the low priority regulation mode for the tertiary frequency modulation if the high priority regulation mode for the tertiary frequency modulation is not available;

S1330) after the use of tertiary frequency modulation, switch the tertiary frequency modulation to the low priority regulation mode if the tertiary frequency modulation is in the high priority regulation mode and the high priority regulation mode for the tertiary frequency modulation is not available;

S1340) after the use of tertiary frequency modulation, judge the availability of the high priority regulation mode for the tertiary frequency modulation if the tertiary frequency modulation is in the low priority regulation mode and the time since the last tertiary frequency modulation mode switching is greater than the preset timing threshold T:

S1341) switch the tertiary frequency modulation to the high priority regulation mode if the high priority regulation mode for the tertiary frequency modulation is available;

S1342) keep the tertiary frequency modulation in the high priority regulation mode if the high priority regulation mode for the tertiary frequency modulation is not available.

5. The tertiary frequency modulation method for the power system according to claim 1, characterized in that the tertiary frequency modulation mode based on the reserved capacity of secondary frequency modulation is to set an array containing n elements in the real-time monitoring system of the power plant, assign a value to the first element in the array in each cycle according to the reserved capacity of the secondary frequency modulation and the tertiary frequency modulation coefficient, and assign values to all elements in the array in turn; after n cycles, all the elements in the array are assigned or iterated, then the corrected power is obtained according to the weighted average of the array, and the plant active power set value is corrected.

6. The tertiary frequency modulation method for the power system according to claim 2, characterized in that the tertiary frequency modulation mode based on the reserved capacity of secondary frequency modulation is to set an array containing n elements in the real-time monitoring system of the power plant, assign a value to the first element in the array in each cycle according to the reserved capacity of the secondary frequency modulation and the tertiary frequency modulation coefficient, and assign values to all elements in the array in turn; after n cycles, all the elements in the array are assigned or iterated, then the corrected power is obtained according to the weighted average of the array, and the plant active power set value is corrected.

7. The tertiary frequency modulation method for the power system according to claim 5, characterized in that regulation in the tertiary frequency modulation mode based on the reserved capacity of secondary frequency modulation includes the following steps:

S3100) a power grid calculates the tertiary frequency modulation coefficient in advance and sends it to the power plant in advance at a fixed period:

S3110) adopt a ratio of whole grid load to KF in the secondary frequency modulation, where KF is the ratio of the regulation amount of secondary frequency modulation to the frequency deviation;

S3120) based on predicted future whole grid load, divide the predicted future whole grid load in each period by the ratio of the whole grid load to KF in the second frequency modulation to obtain KF in each period in future;

S3130) assuming that a total of α power plants are planned to participate in secondary frequency modulation for a certain period in the future, the up-regulated reserved capacity of second frequency modulation for the power plants is $\overline{P}$, and the down-regulated reserved capacity of secondary frequency modulation for the power plants is $\underline{P}$, then:

S3131) a tertiary frequency modulation up-regulation coefficient of the power plant is $\overline{k_f}$, $$\overline{k_f} = K_F \times \frac{\overline{P}}{\sum_{i=1}^{a} \overline{P_i}},$$

where $\overline{P_i}$ is the reserved up-regulated capacity of second frequency modulation for the $i^{th}$ power plant;

S3132) a tertiary frequency modulation down-regulation coefficient of the power plant is $\underline{k_f}$, $$\underline{k_f} = K_F \times \frac{\underline{P}}{\sum_{i=1}^{a} \underline{P_i}},$$

where $\underline{P_i}$ is the reserved down-regulated capacity of second frequency modulation for the $i^{th}$ power plant;

S3200) set an array $$[\Delta p_1^1, \Delta p_1^2 \ldots \Delta p_1^n]$$

containing n elements in the real-time monitoring system of the power plant, where n is a manually set parameter, n×TS is 2 to 3 times the time required for the power plant unit to complete an active power regulation, and the initial value of variables contained by the array is 0; TS is the AGC system cycle;

S3300) assign a value to $$\Delta p_1^1$$

in each AGC system cycle, and assign values to all elements of the array in turn, so that $$\Delta p_1^n = \Delta p_1^{n-1} \text{ and } \Delta p_1^{n-1} = \Delta p_1^{n-2} \ldots \Delta p_1^2 = \Delta p_1^1$$

S3400) assign values to $$\Delta p_1^1$$

as follows:

S3410) when the grid frequency f is less than 50, $$\Delta p_1^1 = (50 - f) \times \overline{k_f};$$

S3420) when the grid frequency f is greater than 50;

$$\Delta p_1^1 = (50 - f) \times \underline{k_f};$$

S3500) after n cycles, all the elements of the array are assigned or iterated, the plant active power set value is corrected according to the array $$[\Delta p_1^1, \Delta p_1^1 \ldots \Delta p_1^n]:$$

S3510) calculate the corrected power $\Delta p_1$ by the weighted average, $$\Delta p_1 = \frac{\sum_{i=1}^{n} \Delta p_1^i \times (n+1-i)}{\sum_{i=1}^{n} n+1-i}; \Delta p_1^i$$

is the $i^{th}$ element of the array;

S3520) if the corrected power $\Delta p_1$ is greater than 0, the plant active power set value is equal to min(plant active power set value+corrected power $\Delta p_1$, the upper limit of the plant active power is adjustable);

S3530) if the corrected power $\Delta p_1$ is less than 0, the plant active power set value is equal to max(plant active power set value+corrected power $\Delta p_1$, the lower limit of the plant active power is adjustable);

S3600) after obtaining the corrected plant active power set value, AGC modifies the active power set value of each unit and performs the active power closed-loop regulation in each unit.

8. The tertiary frequency modulation method for the power system according to claim 1, characterized in that the tertiary frequency modulation mode based on the regulation amount of primary frequency modulation is to set an array containing n elements in the real-time monitoring system of the power plant, assign a value to the first element in the array in each cycle according to the actual regulation amount of primary frequency modulation, the target regulation amount of primary frequency modulation or the corrected regulation amount of primary frequency modulation and assign values to all elements in the array in turn; after n cycles, all the elements in the array are assigned or iterated, then the corrected power is obtained according to the weighted average of the array, and the plant active power set value is periodically corrected.

9. The tertiary frequency modulation method for the power system according to claim 2, characterized in that the tertiary frequency modulation mode based on the regulation amount of primary frequency modulation is to set an array containing n elements in the real-time monitoring system of the power plant, assign a value to the first element in the array in each cycle according to the actual regulation amount of primary frequency modulation, the target regulation amount of primary frequency modulation or the corrected regulation amount of primary frequency modulation and assign values to all elements in the array in turn; after n cycles, all the elements in the array are assigned or iterated, then the corrected power is obtained according to the weighted average of the array, and the plant active power set value is periodically corrected.

10. The tertiary frequency modulation method for the power system according to claim 8, characterized in that regulation in the tertiary frequency modulation mode based on the regulation amount of primary frequency modulation includes the following steps:

S4100) set an array $$[\Delta p_2^1, \Delta p_2^2 \ldots \Delta p_2^n]$$

containing n elements in the real-time monitoring system of the power plant, where n is a manually set parameter, n×TS is 2 to 3 times the time required for the power plant unit to complete an active power regulation, and the initial value of variables contained by the array is 0; TS is the AGC system cycle;

S4200) assign a value to $$\Delta p_2^1$$

in each AGC system cycle, and assign values to all elements of the array in turn, so that $$\Delta p_2^n = \Delta p_2^{n-1} \text{ and } \Delta p_2^{n-1} = \Delta p_2^{n-2} \ldots \Delta p_2^2 = \Delta p_2^1;$$

S4300) select one of the following three alternative methods to assign values to $$\Delta p_2^1$$

in each cycle;

S4310) on the premise that the actual regulation amount of primary frequency modulation can be collected, assign the sum of the actual regulation amount of primary frequency modulation of all units in the generating state to $$\Delta p_2^1;$$

or S4320) assign values to $$\Delta p_2^1$$

using the target regulation amount of primary frequency modulation:

S4321) when the grid frequency is greater than $50+\Delta f_3$, the target regulation amount of primary frequency modulation is equal to the total rated capacity of all units in the generating state multiplied by the power regulation coefficient of primary frequency modulation multiplied by $(50-f+\Delta f_3)$, where $\Delta f_3$ is the primary frequency modulation threshold;

S4322) when the grid frequency f is less than $50-\Delta f_3$, the target regulation amount of primary frequency modulation is equal to the total rated capacity of all units in the generating state multiplied by the power regulation coefficient of primary frequency modulation multiplied by $(50-f-\Delta f_3)$;

S4323) when the power grid frequency f is greater than $50-\Delta f_3$ and less than $50+\Delta f_3$, the target regulation amount of primary frequency modulation is equal to 0;

S4324)

$$\Delta p_2^1 =$$

is equal to the target regulation amount of primary frequency modulation;

or S4330) assign values to $$\Delta p_2^1$$

using the corrected regulation amount of primary frequency modulation:

S4331) when the power grid frequency f is greater than $50+\Delta f_4$, the corrected regulation amount of primary frequency modulation is equal to the total rated capacity of all units in the generating state multiplied by the power regulation coefficient of primary frequency modulation multiplied by $(50-f+\Delta f_4)\times k_1$, where $\Delta f_4$ and $k_1$ are manually set parameters, $0<\Delta f_4<\Delta f_3$, and $0<k_1<1$;

S4332) when the power grid frequency f is less than $50-\Delta f_4$, the corrected regulation amount of primary frequency modulation is equal to the total rated capacity of all units in the generating state multiplied by the power regulation coefficient of primary frequency modulation multiplied by $(50-f-\Delta f_4)\times k_1$;

S4333) when the power grid frequency f is greater than $50-\Delta f_4$ and less than $50+\Delta f_4$, the corrected regulation amount of primary frequency modulation is equal to 0;

S4334)

$$\Delta p_2^1 =$$

is equal to the corrected regulation amount of primary frequency modulation;

wherein, $\Delta f_3<\Delta f_5$, $\Delta f_4<\Delta f_5$, and $\Delta f_5$ is the stop threshold of tertiary frequency modulation;

S4400) after n cycles, all the elements of an array are assigned or iterated, the plant active power set value is corrected according to the array $$[\Delta p_2^1, \Delta p_2^2 \ldots \Delta p_2^n]:$$

S4410) calculate the corrected power Δp2 by the weighted average:

$$\Delta p_2 = \frac{\sum_{i=1}^{n} \Delta p_2^i \times (n+1-i)}{\sum_{i=1}^{n} n+1-i},$$

where $$\Delta p_2^i$$

is the $i^{th}$ element of the array;

S4420) if the corrected power $\Delta p_2$ is greater than 0, the plant active power set value is equal to min(plant active power set value+corrected power $\Delta p_2$, the upper limit of the plant active power is adjustable);

S4430) if the corrected power $\Delta p_2$ is less than 0, the plant active power set value is equal to max(plant active power set value+corrected power $\Delta p_2$, the lower limit of the plant active power is adjustable);

after obtaining the corrected plant active power set value, AGC modifies the active power set value of each unit and performs the active power closed-loop regulation in each unit.

11. The tertiary frequency modulation method for the power system according to claim 1, characterized in that the tertiary frequency modulation mode based on random parameters is to equally segment the actual output value of plant active power, generate random numbers by the real-time monitoring system according to the number of segmented units, and assign the random numbers to each element in the array in turn; take several cycles as an iterative regulation cycle, obtain a random corrected power according to the grid frequency deviation, the capacity of segmented units, the number of specified values in the array and the preset power regulation factor of tertiary frequency modulation in each cycle, and correct the plant active power set value according to the random corrected power; in each iterative regulation cycle, the value of each element in the array is subtracted by 1 when the correction for each cycle is carried out, and then the correction for the next cycle is carried out;

after the number of cycles in one iterative regulation cycle is executed, the random numbers are generated again to execute the next iterative regulation cycle.

12. The tertiary frequency modulation method for the power system according to claim 2, characterized in that the tertiary frequency modulation mode based on random parameters is to equally segment the actual output value of plant active power, generate random numbers by the real-time monitoring system according to the number of segmented units, and assign the random numbers to each element in the array in turn; take several cycles as an iterative regulation cycle, obtain a random corrected power according to the grid frequency deviation, the capacity of segmented units, the number of specified values in the array and the preset power regulation factor of tertiary frequency modulation in each cycle, and correct the plant active power set value according to the random corrected power; in each iterative regulation cycle, the value of each element in the array is subtracted by 1 when the correction for each cycle is carried out, and then the correction for the next cycle is carried out;

after the number of cycles in one iterative regulation cycle is executed, the random numbers are generated again to execute the next iterative regulation cycle.

13. The tertiary frequency modulation method for the power system according to claim 11, characterized in that regulation in the tertiary frequency modulation mode based on random parameters includes the following steps:

S5100) divide n AGC system cycles into an iterative regulation cycle, where n is the manually set parameter, and n×TS is 2 to 3 times the time required for the power plant unit to complete an active power regulation;

S5200) in the first AGC system cycle of each iterative regulation cycle, perform the following operations:

S5210) calculate the number m of segmented units of the power plant participating in the tertiary frequency modulation, m approximates the actual plant active power divided by the capacity β of segmented units, and m is the natural number that is closest to the actual output value of plant active power divided by the capacity of segmented unit;

S5220) set an array U=[u1, u2 . . . um] containing m elements in the real-time monitoring system of the power plant;

S5230) with values ranging from 1 to n, m random integers greater than or equal to 1 and less than or equal to n are generated, and assigned to the elements of the array U in turn;

S5240) make statistics on the number γ of elements equal to 1 in the array U;

S5250) calculate the corrected power $\Delta p_3$:

S5251) when the power grid frequency f is greater than $50+\Delta f_4$, $\Delta p_3=(50-f+\Delta f_4)\times\beta\times\gamma\times k_2$, where $k_2$ is the manually set power adjustment coefficient of tertiary frequency modulation, $\Delta f_4$ is the manually set parameter, $0<\Delta f_4<\Delta f_3$, and $k_2$ is greater than 0 and less than or equal to the power adjustment coefficient of primary frequency modulation;

S5252) when the grid frequency f is less than $50-\Delta f_4$, $\Delta p_3=(50-f-\Delta f_4)\times\beta\times\gamma\times k_2$;

S5253) when the grid frequency f is greater than $50-\Delta f_4$ and less than $50+\Delta f_4$, $\Delta p_3$ is equal to 0;

S5260) correct the AGC plant active power set value:

S5261) if the corrected power $\Delta p_3$ is greater than 0, the plant active power set value is equal to min(plant active power set value+corrected power $\Delta p_3$, the upper limit of the plant active power is adjustable);

S5262) if the corrected power $\Delta p_3$ is less than 0, the plant active power set value is equal to max(plant active power set value+corrected power $\Delta p_3$, the lower limit of the plant active power is adjustable);

after obtaining the plant active power set value, AGC modifies the active power set value of each unit and performs the active power closed-loop regulation in each unit;

S5270) subtract the values of all the elements in the array U by 1, i.e., u1=u1−1, u2=u2−1 . . . um=um−1;

S5300) perform the following operations from the second system cycle to the $n^{th}$ system cycle of each iterative regulation cycle:

S5310) make statistics on the number γ of elements equal to 1 in the array U;

S5320) calculate the corrected power $\Delta p_3$:

S5321) when the power grid frequency f is greater than $50+\Delta f_4$, $\Delta p_3=(50-f+\Delta f_4)\times\beta\times\gamma\times k_2$, where $k_2$ is the manually set power adjustment coefficient of tertiary frequency modulation, $\Delta f_4$ is the manually set parameter, $0<\Delta f_4<\Delta f_3$, and $k_2$ is greater than 0 and less than or equal to the power adjustment coefficient of primary frequency modulation;

S5322) when the grid frequency f is less than $50-\Delta f_4$, $\Delta p_3=(50-f-\Delta f_4)\times\beta\times\gamma\times k_2$;

S5323) when the grid frequency f is greater than $50-\Delta f_4$ and less than $50+\Delta f_4$, $\Delta p_3$ is equal to 0;

S5330) correct the AGC plant active power set value:

S5331) if the corrected power $\Delta p_3$ is greater than 0, the plant active power set value is equal to min(plant active power set value+corrected power $\Delta p_3$, the upper limit of the plant active power is adjustable);

S5332) if the corrected power $\Delta p_3$ is less than 0, the plant active power set value is equal to max(plant active power set value+corrected power $\Delta p_3$, the lower limit of the plant active power is adjustable);

after obtaining the corrected plant active power set value, AGC modifies the active power set value of each unit and performs the active power closed-loop regulation in each unit;

S5340) subtract the values of all the elements in the array U by 1, i.e., u1=u1−1, u2=u2−1 . . . um=um−1;

S5400) after the $n^{th}$ system cycle is executed, go to Step S5200 and start the next iteration cycle.

14. The tertiary frequency modulation method for the power system according to claim 1, characterized in that the stop trigger conditions of the tertiary frequency modulation are as follows:

S6100) when the tertiary frequency modulation is in the starting state, stop the tertiary frequency modulation if any of the following conditions in S6200 to S6600 are met;

S6200) compare the absolute value of the grid frequency deviation with the stop threshold value $\Delta f_5$ for the tertiary frequency modulation; if $|f-50|<\Delta f_5$, stop the tertiary frequency modulation function; $\Delta f_5$ is the manually set parameter, and is less than the starting threshold value $\Delta f_1$ for the tertiary frequency modulation;

S6300) judge whether AGC is put into use in the power plant; if not, stop the tertiary frequency modulation;

S6400) judge whether AGC is put into use in the unit; if not, stop the tertiary frequency modulation;

S6500) judge whether a new AGC regulation instruction is received; if yes, stop the tertiary frequency modulation;

S6600) judge whether the tertiary frequency modulation is in use or exit state; if in exit state, stop the tertiary frequency modulation.

* * * * *